United States Patent
Awoniyi-Oteri et al.

(10) Patent No.: US 12,389,245 B2
(45) Date of Patent: Aug. 12, 2025

(54) WAKE-UP SIGNAL BASED SEMI-PERSISTENT SCHEDULING CONFIGURATION FOR EXTENDED REALITY TRAFFIC

(71) Applicant: QUALCOMM Incorporated, San Diego, CA (US)

(72) Inventors: Olufunmilola Omolade Awoniyi-Oteri, San Diego, CA (US); Wanshi Chen, San Diego, CA (US); Tao Luo, San Diego, CA (US); Jelena Damnjanovic, Del Mar, CA (US); Peter Gaal, San Diego, CA (US); Juan Montojo, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 560 days.

(21) Appl. No.: 17/659,328

(22) Filed: Apr. 14, 2022

(65) Prior Publication Data

US 2023/0337024 A1    Oct. 19, 2023

(51) Int. Cl.
*H04W 24/08* (2009.01)
*H04L 43/087* (2022.01)
*H04W 52/02* (2009.01)
*H04W 72/04* (2023.01)

(52) U.S. Cl.
CPC .......... *H04W 24/08* (2013.01); *H04L 43/087* (2013.01); *H04W 52/0229* (2013.01); *H04W 72/04* (2013.01)

(58) Field of Classification Search
CPC ................ H04L 43/087; H04W 24/08; H04W 52/0229; H04W 68/025; H04W 72/04; H04W 72/11; Y02D 30/70
See application file for complete search history.

(56) References Cited

U.S. PATENT DOCUMENTS

| | | | |
|---|---|---|---|
| 8,767,710 B2* | 7/2014 | Chen ................. | H04W 56/0055 370/350 |
| 2020/0037396 A1* | 1/2020 | Islam ................ | H04W 52/0229 |
| 2020/0145921 A1* | 5/2020 | Zhang ............... | H04W 52/0235 |
| 2020/0214078 A1* | 7/2020 | Jiang ................. | H04W 52/0216 |
| 2021/0250156 A1* | 8/2021 | Kim ...................... | H04W 72/53 |
| 2021/0314925 A1* | 10/2021 | Shin ...................... | H04L 5/0053 |

(Continued)

*Primary Examiner* — Marcus Smith
*Assistant Examiner* — Kai Chang
(74) *Attorney, Agent, or Firm* — Arent Fox, LLP and Qualcomm, Incorporated

(57) ABSTRACT

A method, a computer-readable medium, and an apparatus are provided for wireless communication between a user equipment (UE) and a base station. The UE monitors for a wake-up signal (WUS) within a WUS monitoring window based on a jitter monitoring window associated with jittered data traffic at a base station. The base station transmits, to the UE, the WUS. The UE determines whether the WUS is received within the WUS monitoring window. The UE detects a semi-persistent scheduling (SPS) occasion following a location of the WUS by an offset based on the WUS being received within the WUS monitoring window. The base station transmits, to the UE, in the SPS occasion following the WUS by the offset, a physical downlink shared channel including a data frame of the jittered data traffic.

30 Claims, 12 Drawing Sheets

(56) References Cited

U.S. PATENT DOCUMENTS

| | | | |
|---|---|---|---|
| 2021/0321446 A1* | 10/2021 | Lee | H04W 72/54 |
| 2023/0043789 A1* | 2/2023 | Maleki | H04W 76/28 |
| 2023/0189140 A1* | 6/2023 | Elshafie | H04W 72/23 |
| | | | 370/311 |
| 2024/0014870 A1* | 1/2024 | Ben Hadj Fredj | H04W 76/28 |
| 2024/0276514 A1* | 8/2024 | Fan | H04L 5/0094 |
| 2024/0333656 A1* | 10/2024 | Wang | H04W 72/11 |

\* cited by examiner

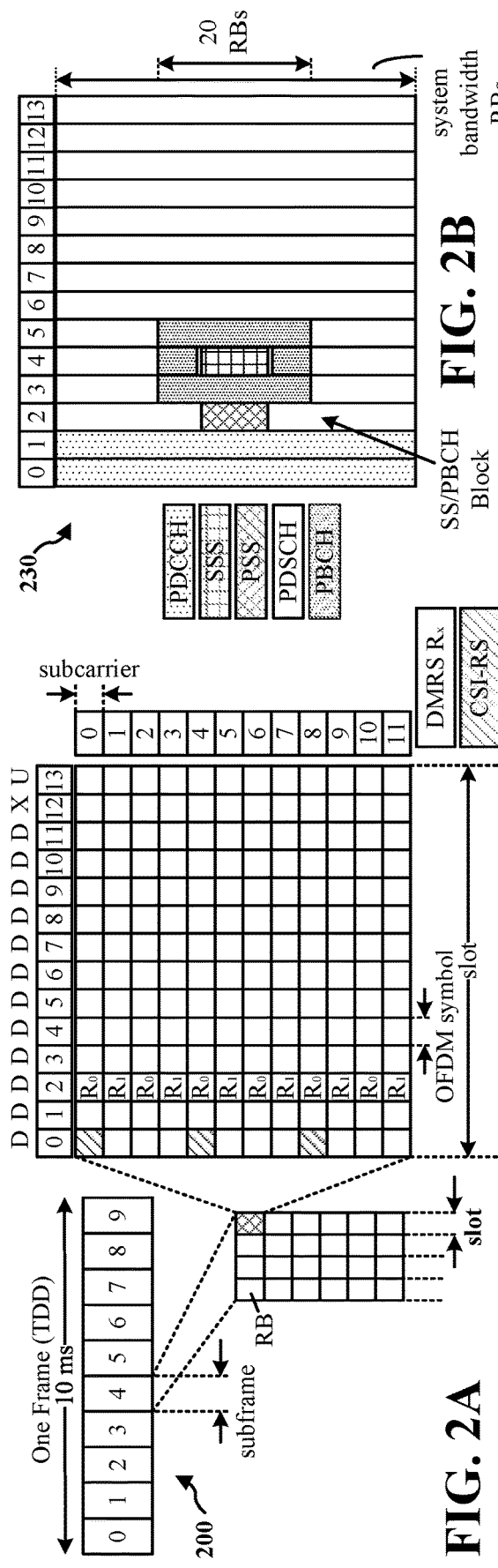
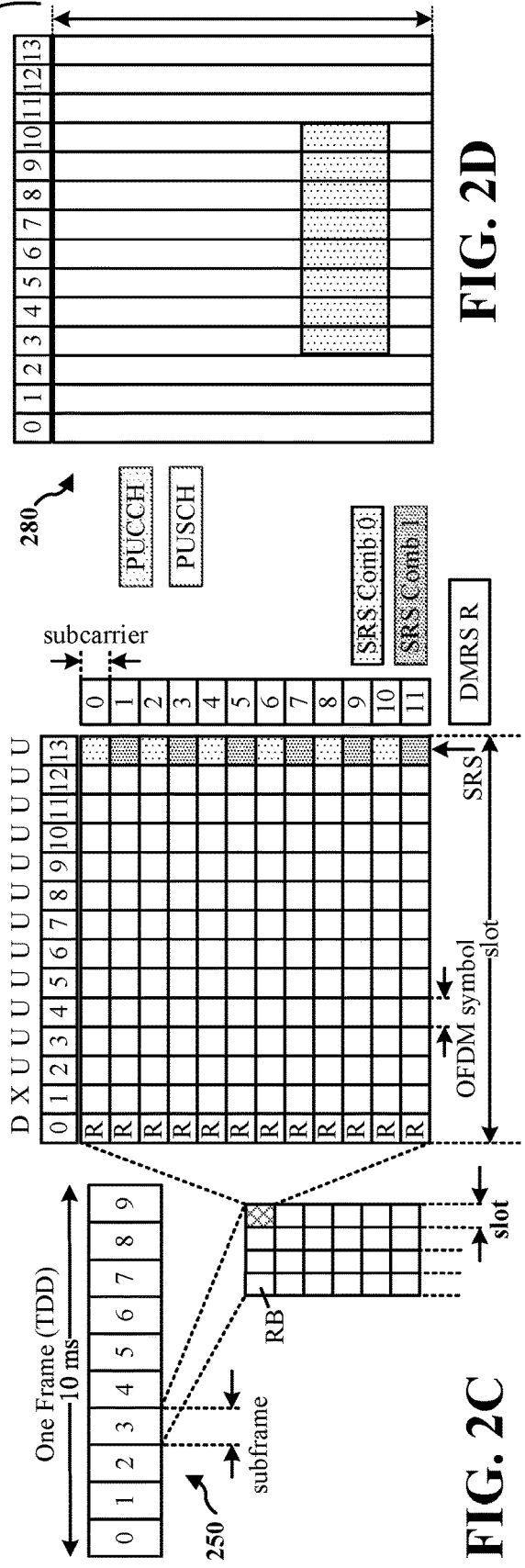

WAKE-UP SIGNAL BASED SEMI-PERSISTENT SCHEDULING CONFIGURATION FOR EXTENDED REALITY TRAFFIC

BACKGROUND

Technical Field

The present disclosure relates generally to communication systems, and more particularly, to wireless communication including wake-up signal based semi-persistent scheduling configuration for extended reality traffic.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus monitors for a wake-up signal (WUS) within a WUS monitoring window based on a jitter monitoring window associated with jittered data traffic at a base station. The apparatus determines whether the WUS is received within the WUS monitoring window. The apparatus detects a semi-persistent scheduling (SPS) occasion following a location of the WUS by an offset based on the WUS being received within the WUS monitoring window.

In another aspect of the disclosure, a method, a computer-readable medium, and an apparatus are provided for wireless communication at a base station. The apparatus transmits, to a UE, a first WUS within a WUS monitoring window based on a jitter monitoring window associated with jittered data traffic at the base station. The apparatus transmits, to the UE, in a first SPS occasion of a plurality of SPS occasions following the first WUS by an offset, a first physical downlink shared channel (PDSCH) comprising a first data frame of the jittered data traffic.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
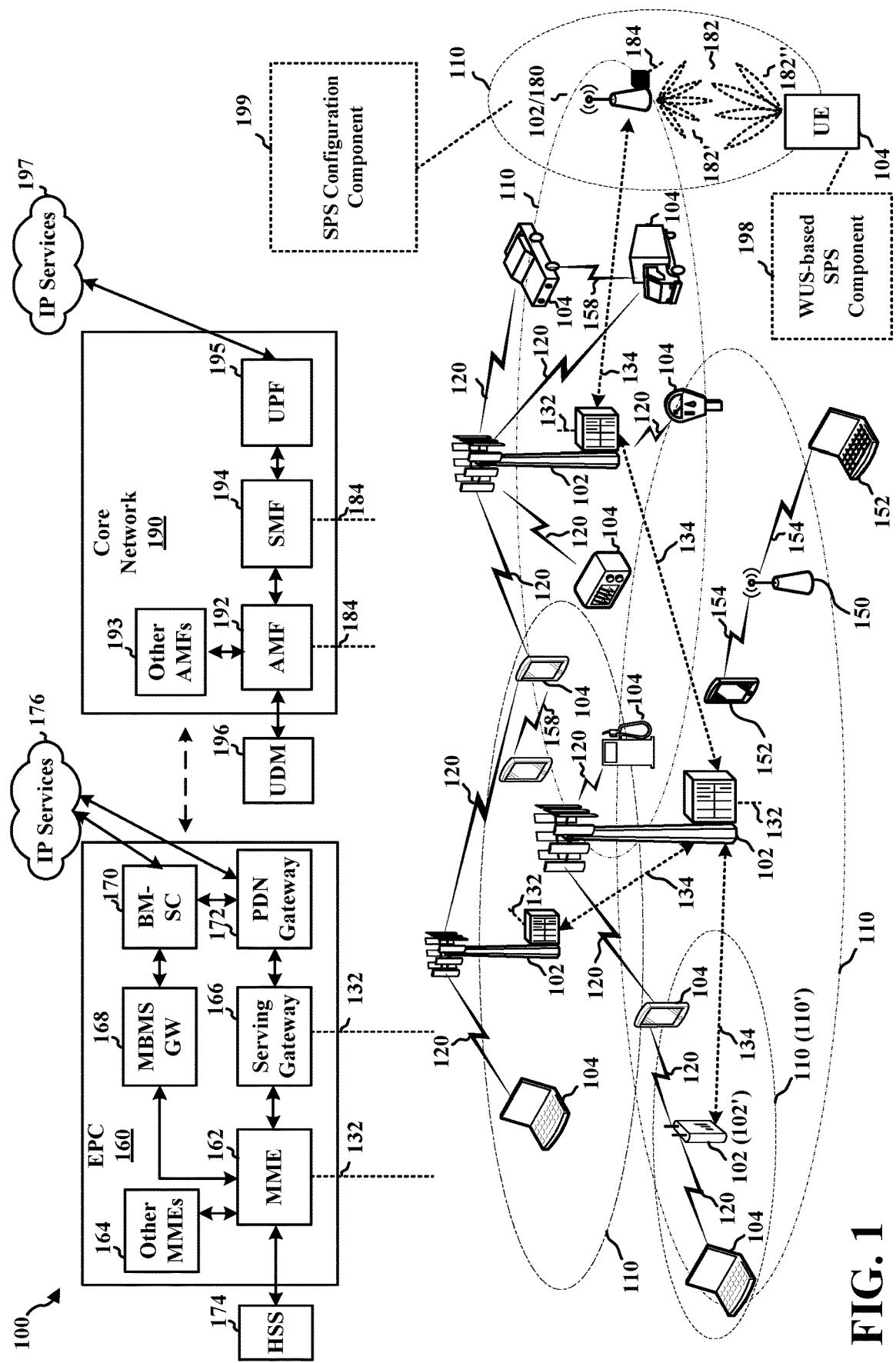
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A base station may schedule downlink (DL) data to the UE on PDSCH dynamically or semi-persistently. In dynamic scheduling, each time the base station schedules DL data on PDSCH (e.g. dynamic DL data), the base station provides downlink control information (DCI) that includes a resource assignment for that PDSCH. The base station may change the resource assignment in DCI every time new dynamic DL data on a PDSCH is scheduled. In contrast, in semi-persistent scheduling (SPS), the base station provides the UE a radio resource control (RRC) message (e.g. an SPS configuration) including a configured resource assignment for scheduled DL data on PDSCH that persists over a period of time (e.g. SPS data). The base station may also provide a DCI that activates the pre-configured resources for SPS. After the UE receives the SPS configuration, the base station may send SPS data on PDSCH in the pre-configured resources (e.g. at SPS PDSCH occasions), without sending a DCI dynamically configuring a new resource assignment for every PDSCH. Thus, the base station may send dynamic DL data or SPS data to the UE. The base station may configure the UE with one SPS configuration or multiple SPS configurations. For instance, the base station may provide different SPS configurations including different resources for the UE to receive SPS data.

SPS resources are periodic resources allocated for a first downlink transmission of transport blocks to the UE and downlink retransmissions are sent via dynamic grants. SPS resources can be sent to the UE without an accompanying PDCCH, therefore, the UE does not have to perform PDCCH detection, processing and decoding. In this regard, the UE can conserve power by not having to consume energy in the detection and acquisition of PDCCH signaling. SPS resources can be configured by the RRC signaling and activated using L1 signaling (e.g., DCI). In some aspects, a scheduling instance of the SPS resource is called a SPS occasion. For a given SPS occasion, the periodicity and configured parameters (e.g., number of RBs, MCS, PUCCH resources for HARQ-ACK feedback, etc.) can be the same for all SPS occasions in each SPS configuration.

The use of configured grants can help reduce control signaling overhead (e.g., PDCCH) for periodic uplink traffic by setting up periodic configured grants as monitoring for control signaling by the UE 104 may require greater power consumption. CG parameters are typically configured via RRC signaling and the activation of the configured grant may be through RRC signaling or L1 signaling. In some aspects, scheduling instance of a CG is called a CG occasion. For a given CG occasion, the periodicity and configured parameters (e.g., number of RBs, MCS, number of repetitions, etc.) can be the same for all CG occasions in a CG configuration.

Some wireless communications system support periodically or semi-periodically scheduled resources for efficient uplink and downlink communications. For example, extended reality (XR) and augmented reality (AR) systems may use periodically or semi-periodically scheduled resources. XR traffic may have low latency requirements while supporting a dynamic frame rate and a variable packet size. Utilizing periodic or semi-periodic resources may reduce control signaling overhead to schedule and coordinate wireless communications. For example, SPS/CG signaling can be used to reduce control resource overhead so that additional resources can be allocated to data transmissions. Additionally, the use of CG for uplink transmissions can reduce latency. Therefore, SPS/CG signaling may be candidates for improving XR capacity applications. However, some legacy SPS/CG features may require enhancements to be used for XR traffic based on one or more characteristics of XR traffic. For example, the number of packets per burst and/or the packet size of each packet may include variability in the XR traffic. In another example, there may be a mismatch between the XR traffic periodicity and the SPS/CG periodicity. In another example, the arrival times of XR traffic at the base station may vary due to jitter. In still another example, multiple flows of XR traffic also may be configured with variable parameters and characteristics. In this regard, it may be desirable to address the variations between the XR traffic and SPS/CG scheduling such that the SPS/CG signaling mechanisms can be used for improving the XR capacity applications.

The subject disclosure provides for a WUS-based SPS configuration for the XR capacity applications. In one or more implementations, a wake-up signal mechanism can be used to compensate for the jitter observed with the arrival of data packets at the base station. In one or more implementations, SPS resources can be reserved for the UE and minimize the need for the transmission of downlink control signaling. In this regard, the use of the SPS configuration for XR traffic applications can help minimize the latency required to send downlink packets to the UE. In one or more implementations, dynamic grant signaling mechanism also can be used to transmit downlink packets occurring after the SPS data transmissions.

The subject technology as described above can provide high throughput data exchange between base station and UEs while minimizing the latency with the WUS-based SPS configuration to address the variabilities in the XR traffic. The subject technology can provide more flexibility to the base station so that the base station does not to persistently transmit multiple XR packets per XR data periodicity with dynamic grant signaling. By maintaining the power consumption of the WUS signaling relatively low, the UE can observe some power consumption savings compared to dynamic grant-based transmissions.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system may support periodically or semi-periodically scheduled resources for efficient uplink and downlink communications. Utilizing periodic or semi-periodic resources may reduce control signaling overhead to schedule and coordinate wireless communications. For example, some types of applications or traffics may have periodic signaling and may be suitable for periodically or semi-periodically scheduled resources, such as Voice over IP, AR applications, or XR applications, any number of which may be implemented by the wireless communications system. Downlink communications may use SPS.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, downlink packets may arrive at a base station 102 or 180 in a periodic manner, and SPS resources may be provided for the transmission of the downlink packets to a UE 104. In some examples, the downlink traffic at the base station 102 or 180 may have a jittered arrival. Aspects presented herein provide a WUS-based SPS configuration that enable the periodic transmission of downlink packets on SPS resources that may experience a jittered arrival at a base station 102 or 180 for transmission to the UE 104, where the UE 104 may detect a WUS to enable the UE 104 to begin monitoring for a SPS occasion such that the UE 104 can successfully receive the downlink packets on the SPS resources while minimizing power consumption during the monitoring. The aspects presented herein may enable low latency downlink traffic to be communicated to the UE 104 in a manner that balances the latency of the communication with efficient scheduling of resources and reducing processing complexity for the UE 104. As presented in more detail in connection with FIGS. 5-8, the base station 102 or 180 may include an SPS configuration component 199 that configures a UE 104 for monitoring for a wake-up signal (WUS) within a WUS monitoring window based on a jitter monitoring window associated with jittered data traffic at the base station 102 or 180. The SPS configuration component 199 may transmit a SPS configuration indicating a plurality of SPS occasions at a default location for each of the plurality of SPS occasions with a prescribed periodicity between respective ones of the plurality of SPS occasions. In some aspects, the default location of each of the plurality of SPS occasions corresponds to a centered location in the jitter monitoring window. Then, the base station 102 or 180 may transmit the WUS to the UE 104 in an opportunity of the WUS monitoring window based on an arrival time of a data packet. The SPS configuration component 199 also may transmit to the UE 104, in a first SPS occasion of the plurality of SPS occasions following the first WUS by an offset, a first PDSCH including a first data frame of the jittered data traffic. The UE 104 may include an SPS component 198 that receives the SPS configuration for the plurality of SPS occasions from the base station 102 or 180, each SPS occasion including multiple opportunities for a downlink transmission by the base station 102 or 180. The SPS component 108 may monitor for a WUS within a WUS monitoring window based on the jitter monitoring window associated with the jittered data traffic at the base station 102/180. The SPS component 198 may determine whether the WUS is received within the WUS monitoring window. Then, the UE 104 may monitor for the downlink transmission during one or more opportunities of the SPS occasion, e.g., until an opportunity in which the UE receives the downlink packet(s), based on the WUS being received within the WUS monitoring window. The SPS occasion may follow a location of the WUS by an offset. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
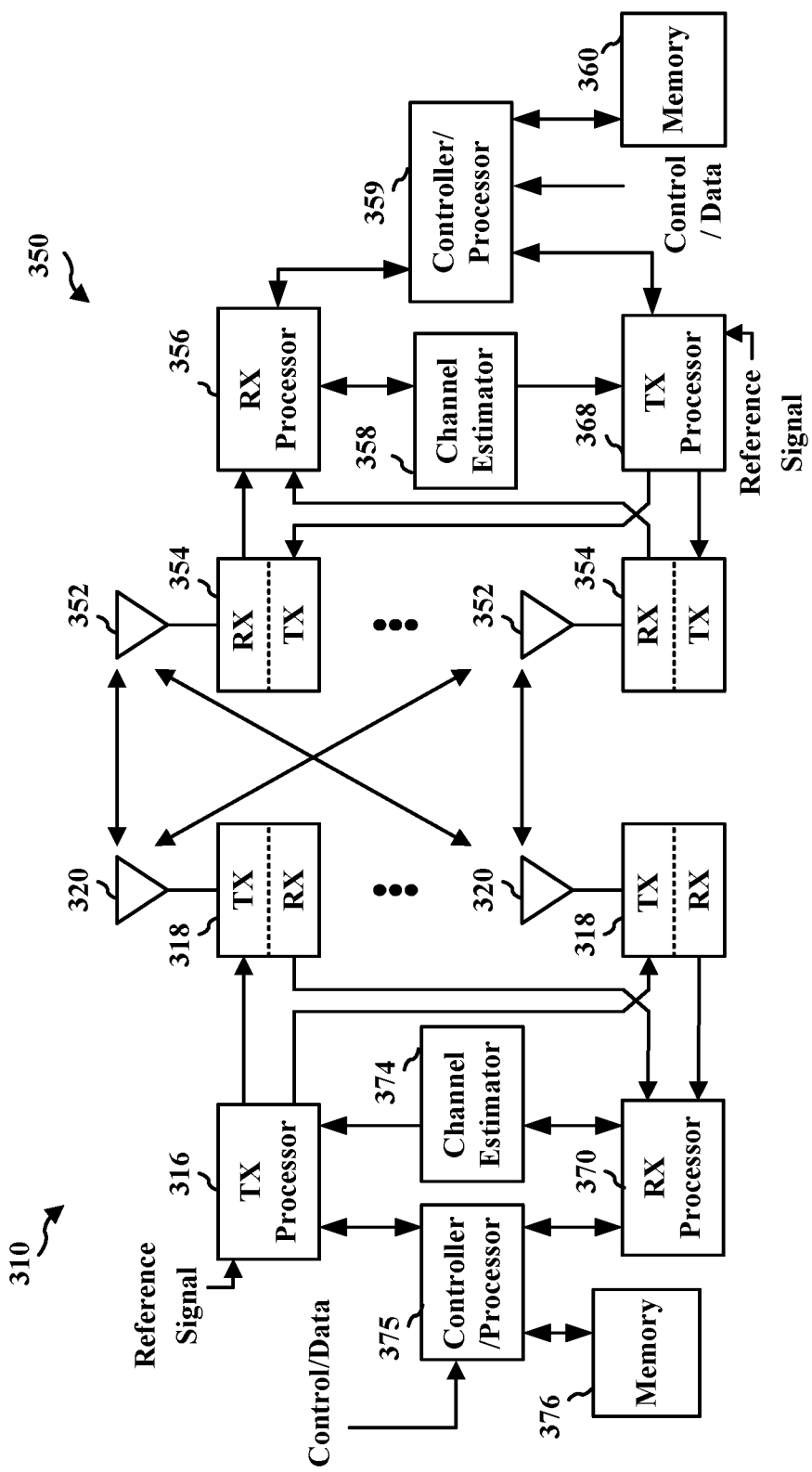
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with WUS-based SPS component 198 of FIG. 1.

At least one of the TX processor 316, the RX processor 370, and the controller/processor 375 may be configured to perform aspects in connection with SPS configuration component 199 of FIG. 1.

The base station 102/180 may schedule downlink (DL) data to the UE 104 on PDSCH dynamically or semi-persistently. In dynamic scheduling, each time the base station 102/180 schedules DL data on PDSCH (e.g. dynamic DL data), the base station 102/180 provides downlink control information (DCI) that includes a resource assignment for that PDSCH. The base station 102/180 may change the resource assignment in DCI every time new dynamic DL data on a PDSCH is scheduled. In contrast, in semi-persistent scheduling (SPS), the base station 102/180 provides the UE a radio resource control (RRC) message (e.g. an SPS configuration) including a configured resource assignment for scheduled DL data on PDSCH that persists over a period of time (e.g. SPS data). The base station 102/180 may also provide a DCI that activates the pre-configured resources for SPS. After the UE 104 receives the SPS configuration, the base station 102/180 may send SPS data on PDSCH in the pre-configured resources (e.g. at SPS PDSCH occasions), without sending a DCI dynamically configuring a new resource assignment for every PDSCH. Thus, the base station 102/180 may send dynamic DL data or SPS data to the UE 104. The base station 102/180 may configure the UE 104 with one SPS configuration or multiple SPS configurations. For instance, the base station 102/180 may provide different SPS configurations including different resources for the UE 104 to receive SPS data.

As described above, SPS/CG signaling can be used to reduce control resource overhead so that additional resources can be allocated to data transmissions. Additionally, the use of CG for uplink transmissions can reduce latency. Therefore, SPS/CG signaling may be candidates for improving XR capacity applications. However, some legacy SPS/CG features may require enhancements to be used for XR traffic based on one or more characteristics of XR traffic. For example, the number of packets per burst and/or the packet size of each packet may include variability in the XR traffic. In another example, there may be a mismatch between the XR traffic periodicity and the SPS/CG periodicity. In another example, the arrival times of XR traffic at the base station 102/180 may vary due to jitter. In still another example, multiple flows of XR traffic also may be configured with variable parameters and characteristics. In this regard, it may be desirable to address the variations between the XR traffic and SPS/CG scheduling such that the SPS/CG signaling mechanisms can be used for improving the XR capacity applications.

The subject disclosure provides for a WUS-based SPS configuration for the XR capacity applications. In one or more implementations, a wake-up signal mechanism can be used to compensate for the jitter observed with the arrival of data packets at the base station. In one or more implementations, SPS resources can be reserved for the UE 104 and minimize the need for the transmission of downlink control signaling.

In this regard, the use of the SPS configuration for XR traffic applications can help minimize the latency required to send downlink packets to the UE 104. In one or more implementations, dynamic grant signaling mechanism also can be used to transmit downlink packets occurring after the SPS data transmissions. The subject technology as described above can provide high throughput data exchange between base station and UEs while minimizing the latency with SPS configuration to address the variabilities in the XR traffic. The subject technology can provide more flexibility to the base station so that the base station does not to persistently transmit multiple XR packets per XR data periodicity with dynamic grant signaling. By maintaining the power consumption of the WUS signaling relatively low, the UE 104 can observe some power savings compared to dynamic grant-based transmissions.

Figure 4:
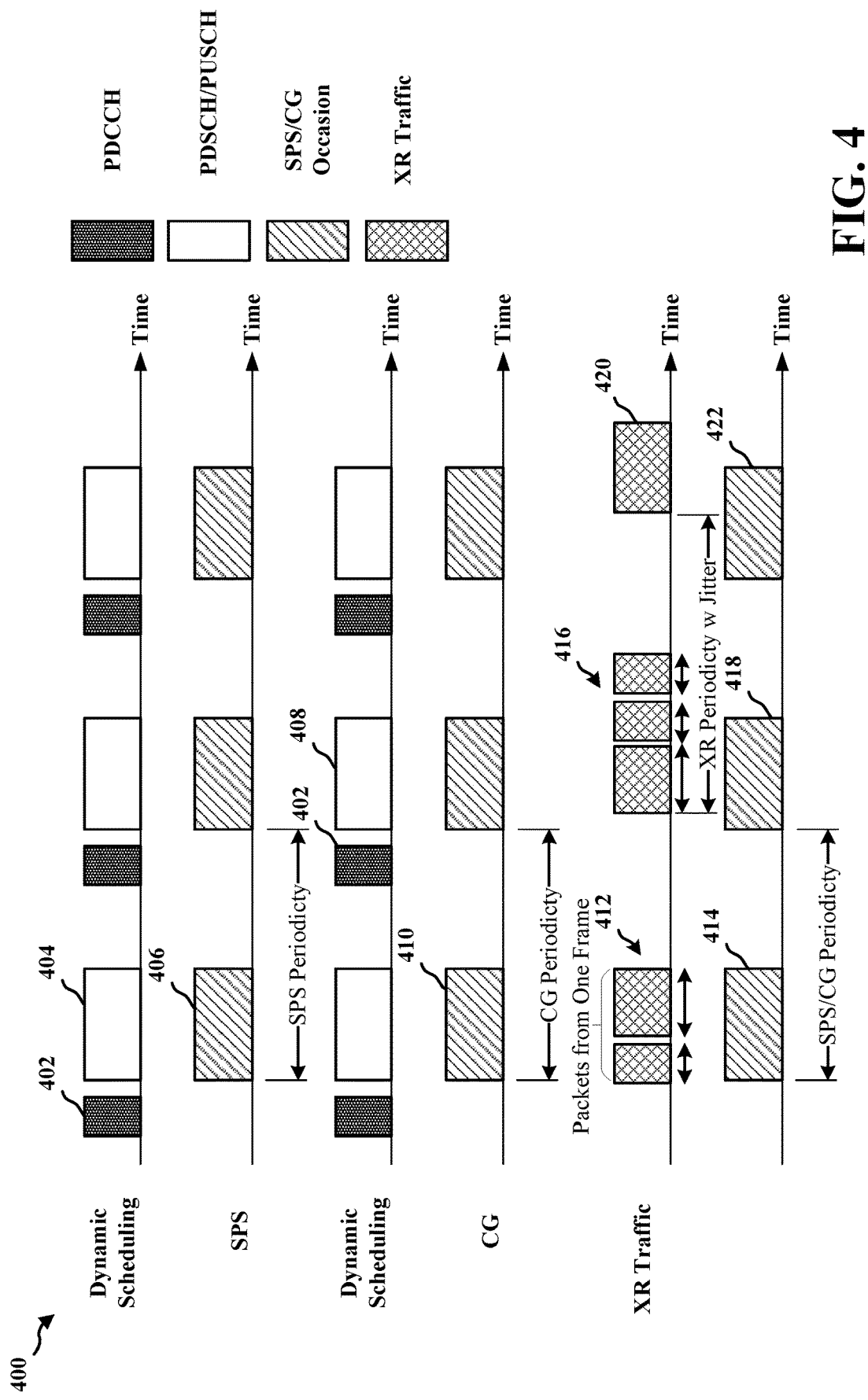
FIG. 4 illustrates example aspects of dynamic scheduling and jittered periodic traffic.

FIG. 4 illustrates example aspects of dynamic SPS/CG scheduling and jittered periodic traffic. SPS resources are periodic resources allocated for a first downlink transmission of transport blocks to a UE (e.g., the UE 104) and downlink retransmissions are sent via dynamic grants. SPS resources can be sent to the UE without an accompanying PDCCH (e.g., 402), therefore, the UE does not have to perform PDCCH detection, processing and decoding. In this regard, the UE can conserve power by not having to consume energy in the detection and acquisition of PDCCH signaling. The SPS resources can be configured by RRC signaling and activated using L1 signaling (e.g., DCI). In some aspects, a scheduling instance of the SPS resource can be referred to as a SPS occasion (e.g., 406). For a given SPS occasion, the periodicity and configured parameters (e.g., number of RBs, MCS, PUCCH resources for HARQ-ACK feedback, etc.) can be the same for all SPS occasions in each SPS configuration.

The use of configured grants can help reduce control signaling overhead (e.g., PDCCH 402) for periodic uplink traffic (e.g., 408) by setting up periodic configured grants as monitoring for control signaling by the UE 104 may require greater power consumption. CG parameters are typically configured via RRC signaling and the activation of the configured grant may be through RRC signaling or L1 signaling. In some aspects, scheduling instance of a CG can be referred to as a CG occasion (e.g., 410). For a given CG occasion, the periodicity and configured parameters (e.g., number of RBs, MCS, number of repetitions, etc.) can be the same for all CG occasions in a CG configuration.

SPS/CG signaling can be used to reduce control resource overhead so that additional resources can be allocated to data transmissions. Additionally, the use of CG for uplink transmissions can reduce latency. Therefore, SPS/CG signaling may be candidates for improving XR capacity applications. However, some legacy SPS/CG features may require enhancements to be used for XR traffic based on one or more characteristics of XR traffic. For example, the number of packets per burst and/or the packet size of each packet may include variability in the XR traffic. In another example, there may be a mismatch between the XR traffic periodicity and the SPS/CG periodicity. In another example, multiple flows of XR traffic also may be configured with variable parameters and characteristics.

The characteristics and periodicity of the downlink packets may be scheduled in an efficient manner based on SPS resources. The efficient scheduling of the transmissions may be helpful, e.g., to a base station that supports a multiple number of UEs and may provide periodic downlink packets to the UEs. However, the jittered arrival of the downlink packets presents a challenge to the base station in scheduling the downlink transmission using SPS resources. For example, the arrival times of XR traffic at the base station may vary due to jitter. In this regard, it may be desirable to address the variations between the XR traffic and SPS/CG scheduling such that the SPS/CG signaling mechanisms can be used for improving the XR capacity applications.

As illustrated in FIG. 4, the XR traffic may include downlink packets (e.g., 412, 416, 420) that may arrive at a base station (e.g., the base station 102/180) in a periodic manner. The base station 102/180 may allocate SPS resources (e.g., 414, 418, 422) for the transmission of the downlink packets to a UE (e.g., the UE 104). However, in some examples, the downlink XR traffic may have a jittered arrival. As illustrated in FIG. 4, the actual arrival times of one or more downlink data frames may vary, e.g., may arrive at a non-deterministic instant, between data frames. For example, the packets may have a jittered arrival with respect to a scheduled arrival pattern. The arrival time may correspond to a time at which a base station expects to receive the downlink packets for transmission to the UE 104. In some aspects, a data frame 412, comprised of one or more packets, may arrive at the base station in its entirety within a scheduled arrival time such that the base station 102/180 can transmit the data packets within a scheduled SPS occasion 414. In other aspects, a data frame 416 may include one or more data packets that arrive after the start of a scheduled SPS occasion 418 but within the duration of the SPS occasion 418; however, the remaining data packets may arrive near the end of the SPS occasion 418 that extend beyond the duration of the SPS occasion 418. In this regard, the base station 102/180 may need to transmit the remaining data packets separately to the UE 104 via dynamic control signaling. In still other aspects, a data frame 420 may arrive after the start of a scheduled SPS occasion 422 but is not received entirely at the base station 102/180 until after the end of the SPS occasion 422. In this regard, the base station 102/180 may need to transmit the data frame at a later scheduled SPS occasion or via dynamic control signaling to the UE 104, and thereby, causing additional latency to be incurred in the communication between the base station 102/180 and the UE 104.

As will be discussed with reference to FIG. 5, the subject disclosure provides for a WUS-based SPS configuration for the XR capacity applications. In one or more implementations, a wake-up signal mechanism can be used to compensate for the jitter observed with the arrival of data packets at the base station. In one or more implementations, SPS resources can be reserved for the UE and minimize the need for the transmission of downlink control signaling. The use of the SPS configuration for XR traffic applications can help minimize the latency required to send downlink packets to the UE. In one or more implementations, dynamic grant signaling mechanism also can be used to transmit downlink packets occurring after the SPS data transmissions.

Aspects presented herein provide WUS-based SPS resources that enable the periodic transmission of downlink packets that may experience a jittered arrival at a base station. The aspects presented herein may enable low latency downlink traffic to be communicated to the UE in a manner that balances the low latency of the communication with efficient scheduling of resources and reduced processing complexity for the UE. Aspects presented herein may improve the periodic communication of small, low-latency packets, e.g., to reduced capability UEs including UEs intended for extended reality applications.

Figure 5:
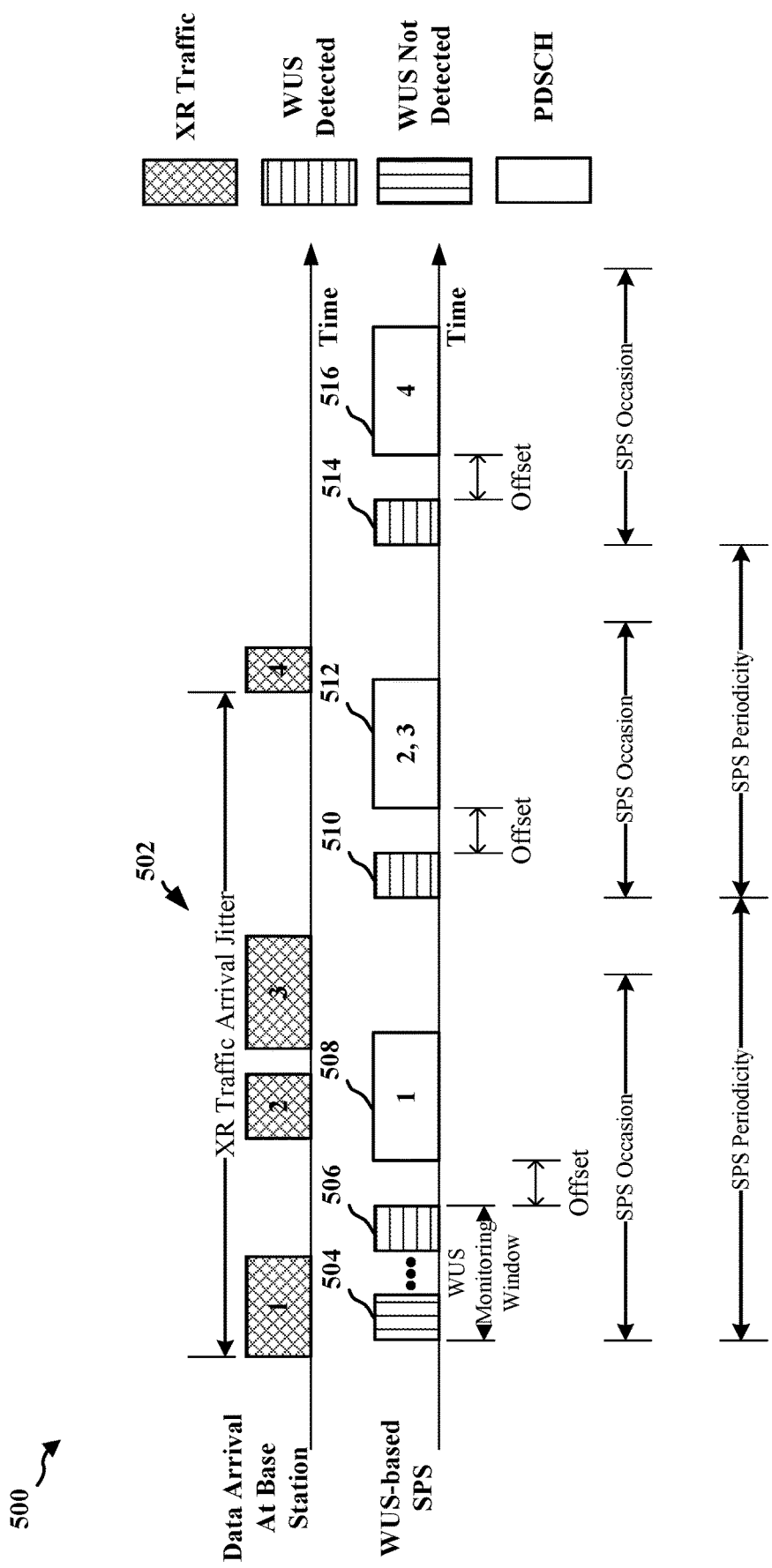
FIG. 5 illustrates an example of WUS-based SPS scheduling for jittered periodic traffic in accordance with aspects presented herein.

FIG. 5 illustrates an example of WUS-based SPS scheduling for jittered periodic traffic in accordance with aspects presented herein. As illustrated in FIG. 5, a UE (e.g., the UE 104) monitors for a first WUS (e.g., 504) within a first WUS monitoring window. In some aspects, the UE may monitor for a WUS within a WUS monitoring window based on a jitter monitoring window associated with jittered data traffic 502 at the base station 102/180. In some aspects, the UE may search for the WUS at the beginning of the first WUS monitoring window. The UE may determine whether the WUS is received within the WUS monitoring window. During the first WUS monitoring window, the UE detects the first WUS (e.g., 506).

In some aspects, the WUS includes a density that is set to tradeoff latency (e.g., packet arrival and transmission at the base station) with power consumption of the WUS detection. In some aspects, the density can be determined based on the configured WUS periodicity and/or a first WUS location carrying information about a second WUS location (e.g., future scheduled WUS location).

In some aspects, the WUS may carry a payload indicating to the UE to skip monitoring of the PDSCH in a SPS occasion, to monitor for the PDSCH in the SPS occasion, or to modify the PDSCH of the SPS occasion. In other aspects, the WUS may contain information indicating the MCS to be used in the PDSCH in the SPS occasion.

In one or more implementations, the WUS can be assumed to be a sequence-based transmission (e.g. DMRS) to minimize power control signaling. In other implementations, the WUS can be channel-based, such as PDCCH or PDSCH based.

The UE receives a first PDSCH 508 that includes a first data packet of the jittered data traffic 502 within a first SPS occasion of a plurality of SPS occasions following the first WUS by the offset. The UE may detect a SPS occasion following a location of the WUS by an offset based on the WUS being received within the WUS monitoring window. In some aspects, the offset is a fixed time offset.

In one or more implementations, the SPS configuration, activation and deactivation may be based on legacy SPS procedure (e.g., 3GPP Standards Release 15/16). There is a default location of SPS occasions with a certain SPS periodicity. The location of the SPS occasions can be set relative to the center of the jitter monitoring window by default.

The UE receives a second WUS 510 within a second WUS monitoring window. In some aspects, the UE receives a second PDSCH 512 that includes second and third data packets of the jittered data traffic within a second SPS occasion of the plurality of SPS occasions following the second WUS 510 by the offset. In some aspects, the UE receives a third WUS 514 within a third WUS monitoring window. The UE receives a third PDSCH 516 that includes a fourth data packet of the jittered data traffic within a third SPS occasion of the plurality of SPS occasions following the third WUS 514 by the offset. In this regard, the wake-up signal mechanism is used to compensate for the jitter observed with the arrival of data packets at the base station. Additionally, SPS resources are reserved for the UE and minimize the need for the transmission of downlink control signaling. The use of the WUS-based SPS configuration for XR traffic applications can help minimize the latency required to send downlink packets to the UE.

Figure 6:
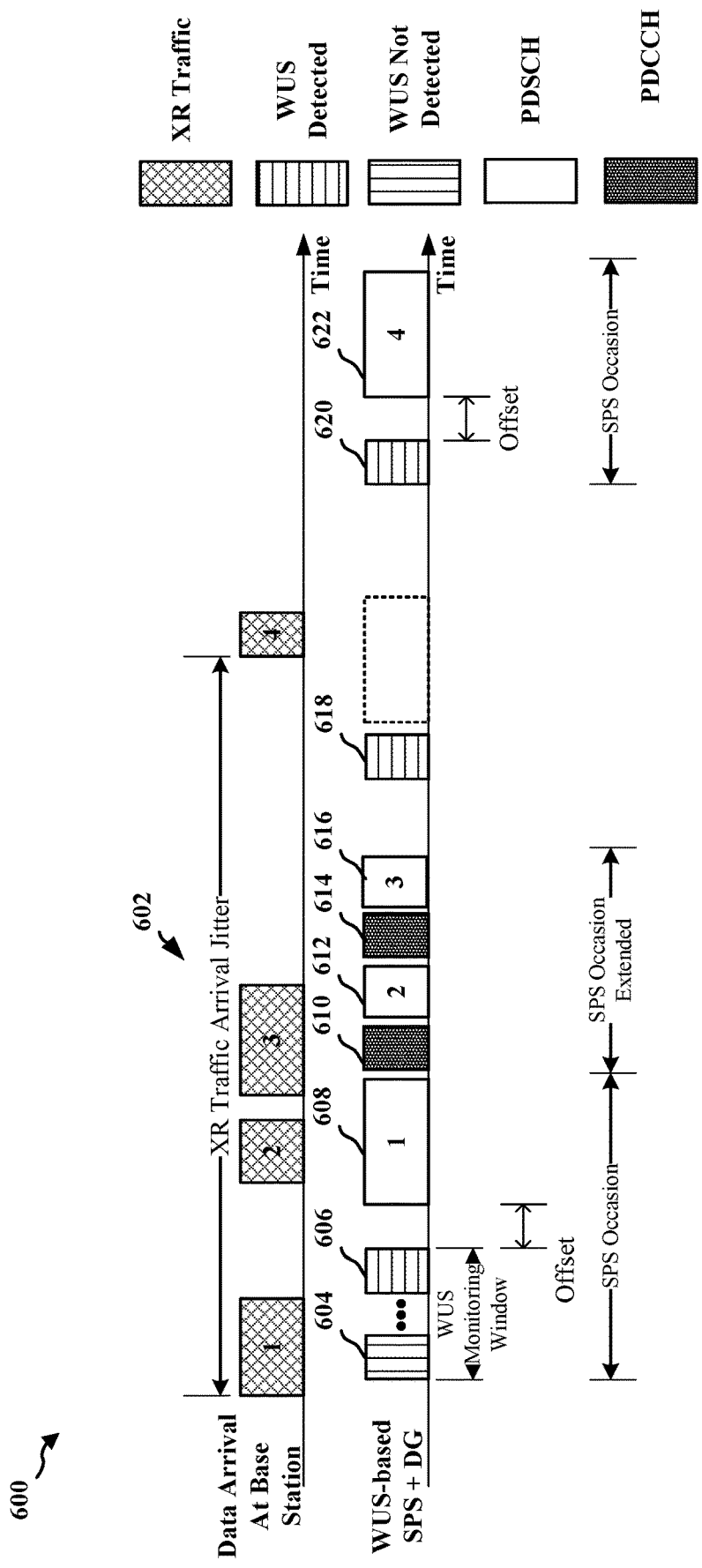
FIG. 6 illustrates an example of WUS-based SPS scheduling with dynamic grant scheduling for jittered periodic traffic in accordance with aspects presented herein.

FIG. 6 illustrates an example of WUS-based SPS scheduling with dynamic grant scheduling for jittered periodic traffic in accordance with aspects presented herein. In one or more implementations, a UE (e.g., the UE 104) monitors for a first WUS (e.g., 604) within a first WUS monitoring window. In some aspects, the UE receives a first WUS 606 within a first WUS monitoring window relative to the jitter monitoring window. The UE receives a first PDSCH 608 that includes a first data packet of the jittered data traffic within a first SPS occasion of a plurality of SPS occasions following the first WUS 606 by the offset.

To reduce the delay for packets that arrive after the SPS occasions, a dynamic grant signaling mechanism can be used to transmit downlink packets that arrive at the base station after the SPS occasion. In this case, after the UE receives an SPS occasion, the UE can begin monitoring for a PDCCH in the event of a dynamic grant transmission from the base station. In some aspects, monitoring for the PDCCH can be enabled after the SPS occasion for DG. In some aspects, the UE transitions to a mode that monitors for the PDCCH after SPS detection. In some aspects, the window for monitoring for the PDCCH may be limited to the length of the jitter monitoring window since the probability of a packet arriving at the base station after the jitter monitoring window is minimal.

As illustrated in FIG. 6, the UE receives a first PDCCH 610 that includes a dynamic grant following the first SPS occasion. The UE receives a second PDSCH 612 that includes a second data packet of the jittered data traffic based on the dynamic grant. In other aspects, the UE receives a second PDCCH 614 that includes a dynamic grant following transmission of the second PDSCH 612 to the UE. The UE receives a third PDSCH 616 that includes a third data packet of the jittered data traffic based on the dynamic grant.

In some implementations, the UE receives a second WUS 618 within a second WUS monitoring window relative to the jitter monitoring window. In some aspects, the second WUS 618 includes information to the UE to refrain from monitoring for a second SPS occasion of the plurality of SPS occasions based on the second and third data packets being already transmitted to the UE. In this regard, the UE refrains from (or skips) monitoring for the second SPS occasion based on the information in the second WUS 618.

The UE receives a fourth PDSCH 622 that includes a fourth data packet of the jittered data traffic within a third SPS occasion of the plurality of SPS occasions following the third WUS 620 by the offset. In this regard, the wake-up signal mechanism is used to compensate for the jitter observed with the arrival of data packets at the base station. Additionally, SPS resources are reserved for the UE and minimize the need for the transmission of downlink control signaling. In contrast to FIG. 5, dynamic grant signaling mechanism can be used to transmit downlink packets arriving after occurrence of the SPS occasions. The use of the WUS-based SPS configuration for XR traffic applications can help minimize the latency required to send downlink packets to the UE.

Figure 7:
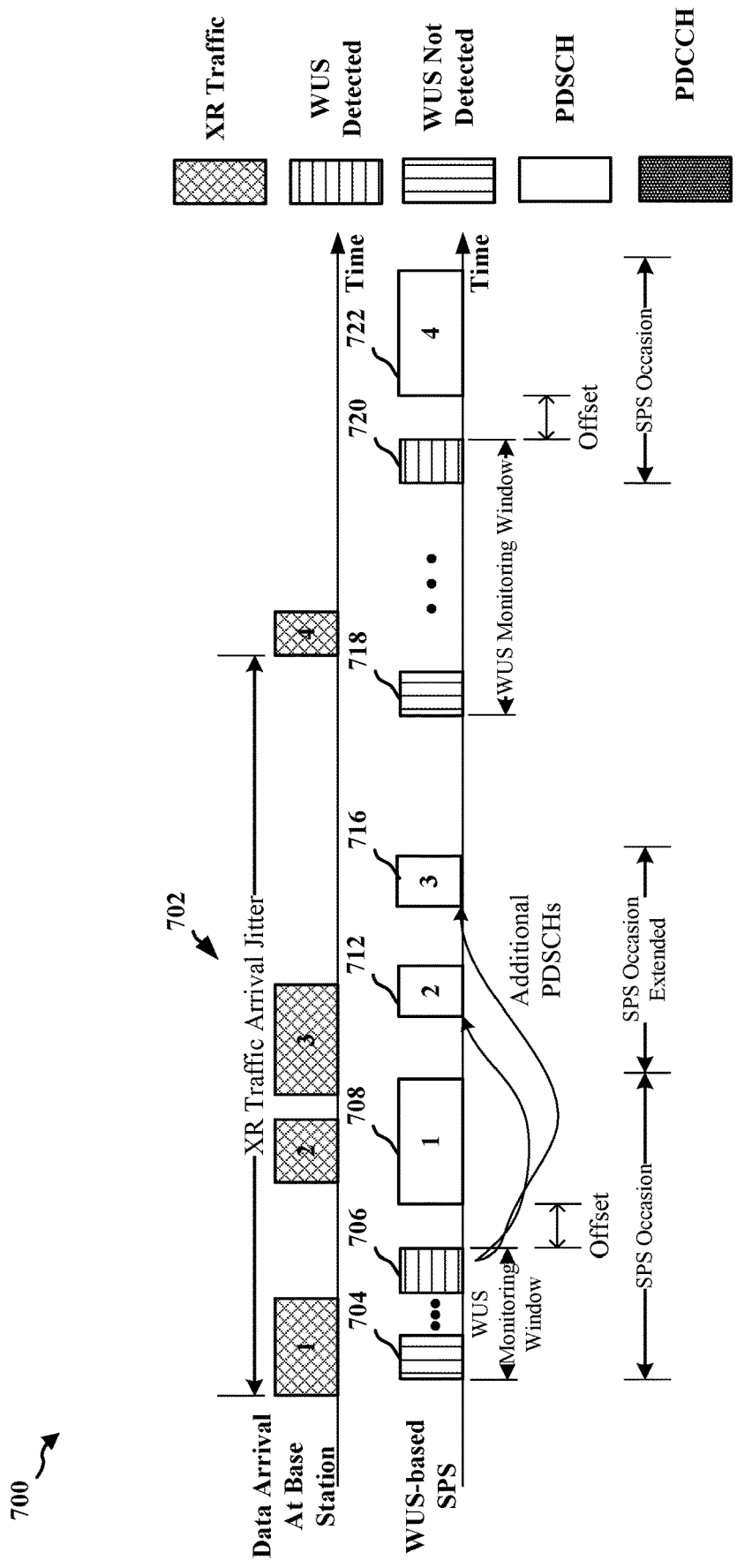
FIG. 7 illustrates another example of WUS-based SPS scheduling for jittered periodic traffic in accordance with aspects presented herein.

FIG. 7 illustrates another example of WUS-based SPS scheduling for jittered periodic traffic in accordance with aspects presented herein. In one or more implementations, a UE (e.g., the UE 104) monitors for a WUS (e.g., 704) within a first WUS monitoring window relative to the jitter monitoring window. In some aspects, the UE receives a first WUS 706 within the first WUS monitoring window.

In some aspects, the first WUS includes a payload with information to the UE to activate one or more preconfigured resources after a first SPS occasion of a plurality of SPS occasions so that the PDCCH carrying dynamic grant signaling may not have to be sent. In this regard, the first WUS may serve as the dynamic signaling, where the first WUS includes activation information. In some aspects, the first WUS may include deactivation information that indicates to the UE to refrain from monitoring for any subsequent SPS occasions. The UE receives a first PDSCH 708 that includes a first data packet of the jittered data traffic within the first SPS occasion following the first WUS by the offset.

The UE then receives a second PDSCH 712 that includes a second data packet of the jittered data traffic after the first SPS occasion using the one or more preconfigured resources. In some aspects, the UE also receives, using the one or more preconfigured resources, a third PDSCH 714 that includes a third data packet of the jittered data traffic.

The UE monitors for a second WUS (e.g., WUS 718) within a second WUS monitoring window relative to the jitter monitoring window. The UE receives a second WUS (e.g., 720) within a second WUS monitoring window relative to the jitter monitoring window. In some aspects, the UE determines whether the second WUS 720 is received within the second WUS monitoring window.

The UE then receives a fourth PDSCH 722 that includes a fourth data packet of the jittered data traffic within a second SPS occasion following the second WUS 720 by the offset. To reduce the latency for reception of the fourth data packet, during the WUS detection, the second WUS monitoring window can be increased dynamically if the second WUS is not detected (e.g., 718) during the initial portion of the second WUS monitoring. In this case, the UE may monitor for the second WUS past the initial location of the SPS occasion and even into a PDCCH monitoring window region, until the WUS is detected and the fourth data packet is received using the SPS resources In one or more implementations, the UE adjusts the second WUS monitoring window by a length that extends beyond one or more of a default location of the second SPS occasion or a location of the PDCCH monitoring window. In some aspects, the UE receives the second WUS 720 within the adjusted second WUS monitoring window (e.g., denoted as "SPS Occasion" including the "SPS Occasion Extended").

Figure 8:
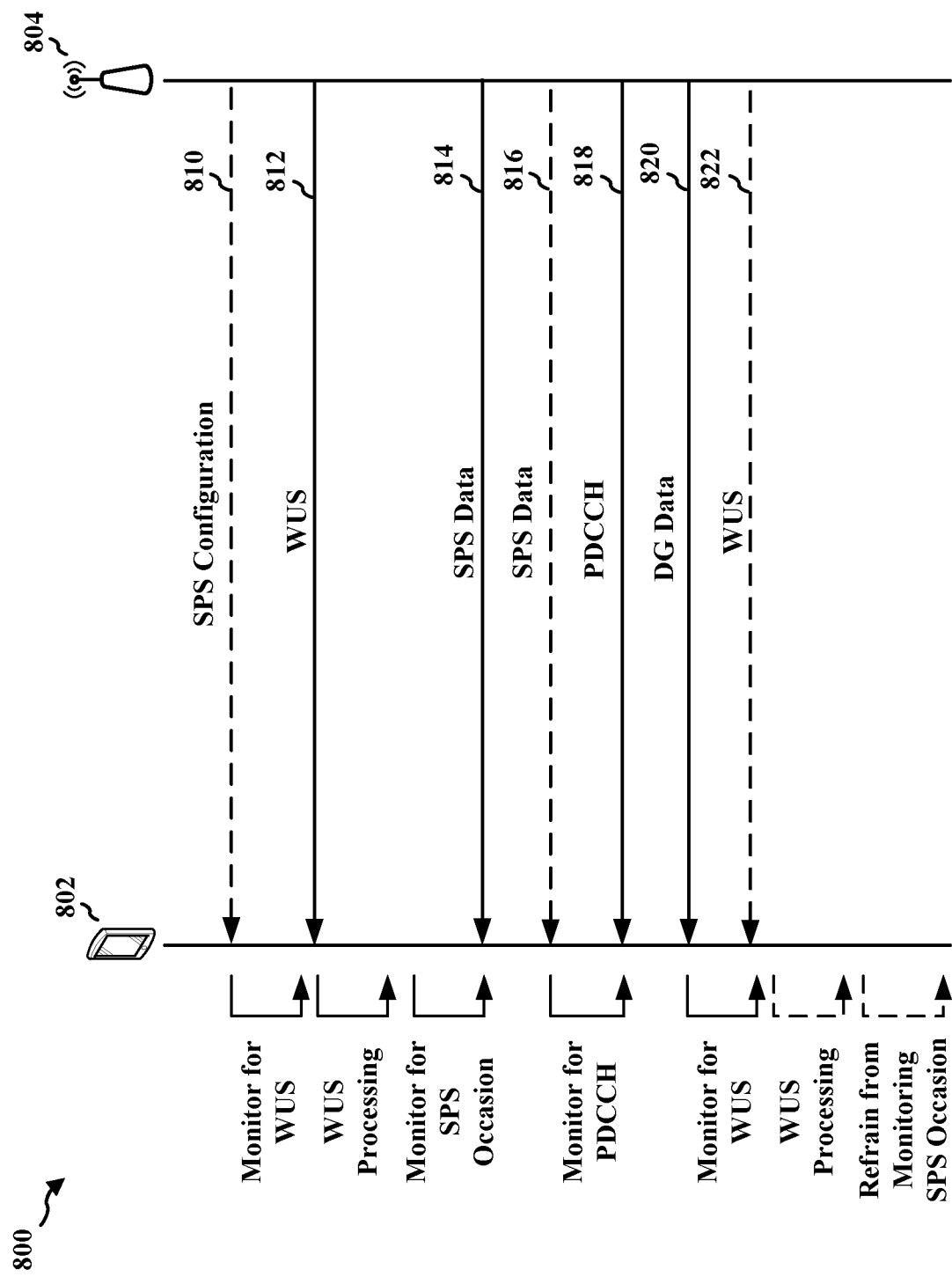
FIG. 8 illustrates an example of a call flow between a base station and UE for WUS-based SPS configuration in accordance with aspects presented herein.

FIG. 8 illustrates a diagram 800 of a call flow between a UE 802 and a base station 804 for WUS-based SPS configuration. The UE 802 may be similar to the UE 104 and the base station 804 may be similar to the base station 102/180. The base station 804 may transmit SPS configuration 810 to the UE 802. The SPS configuration 810 may be, for example, statically or semi-statically scheduled configuration (e.g., RRC signalling) or dynamically scheduled configuration (e.g. DCI or L1 signaling) in a PDCCH. The UE 802 can monitor for a WUS based on the SPS configuration 810. The base station 804 may transmit a WUS 812 to the UE 802. The UE 802 may process the WUS 812 to determine whether the WUS 812 was received during a WUS monitoring window. If the WUS 812 was received at the UE 802 within the WUS monitoring window, then the UE 802 may monitor for a SPS occasion.

In one or more implementations, the SPS configuration 810 includes a WUS configuration. In some aspects, the WUS configuration may be applied across multiple carriers. For scenarios involving multiple streams (e.g., audio stream, video stream, media stream, etc.), the base station 804 may select to use multiple carriers. For example, the WUS configuration and/or the SPS configuration may configure the SPS periodicity, the jitter monitoring window and/or SPS parameters (e.g., where the MCS may be different for each UE and each carrier). In other aspects, the WUS configuration may be applied across different (or multiple) UEs. This can be used in scenarios where multiple UEs in a network are configured to operate with a similar type of traffic. The WUS can be sent across the multiple UEs; however, a particular UE may monitor for a specific WUS based on the offset and periodicity of when its own traffic started. This can help reduce the frequency of transmitting the WUS per UE. In some aspects, the WUS can be scrambled with a cell radio network temporary identifier (CRNTI) of one or more of the multiple UEs so that the UE knows whether to decode a WUS message intended for it or not.

The base station also may transmit SPS data 814 within the SPS occasion to the UE 802. The SPS data 814 may be, for example, semi-persistently scheduled data (e.g. SPS data) in a PDSCH. The UE 802 may receive the SPS data 814 following the WUS 812 by an offset. In some aspects, the offset is a fixed time offset.

In one or more implementations, the WUS 812 may include a payload with information to the UE 802 to activate one or more preconfigured SPS resources after a first SPS occasion of a plurality of SPS occasions so that a PDCCH carrying dynamic grant signaling may not have to be sent to the UE 802. In this regard, the base station 804 may optionally transmit SPS data 816 on the one or more preconfigured SPS resources following transmission of the SPS data 814. The UE 802 receives SPS data 816 after the first SPS occasion using the one or more preconfigured SPS resources.

In one or more implementations, the UE 802 may monitor for a PDCCH if the SPS occasion is detected. The base station 804 transmits PDCCH 818 to the UE 802. The UE 802 receives the PDCCH 818, which includes dynamic grant signaling. The base station 804 can transmit additional downlink data packets that may have arrived at the base station 804 after the SPS occasion. The base station 804 transmits dynamic grant data 820 to the UE 802.

In some aspects, the UE 802 may monitor for any additional WUSs. The base station 804 transmits a second WUS 822 to the UE 802. The UE 802 can process the WUS 822 to determine whether the WUS 822 was received within the WUS monitoring window. Additionally, the WUS 822 may include information to the UE 802 to refrain from monitoring for a second SPS occasion based on the SPS data 814, 816 being already transmitted to the UE 802. In this regard, the UE 802 may refrain from (or skip) monitoring for the second SPS occasion based on the information in the second WUS 822.

Figure 9:
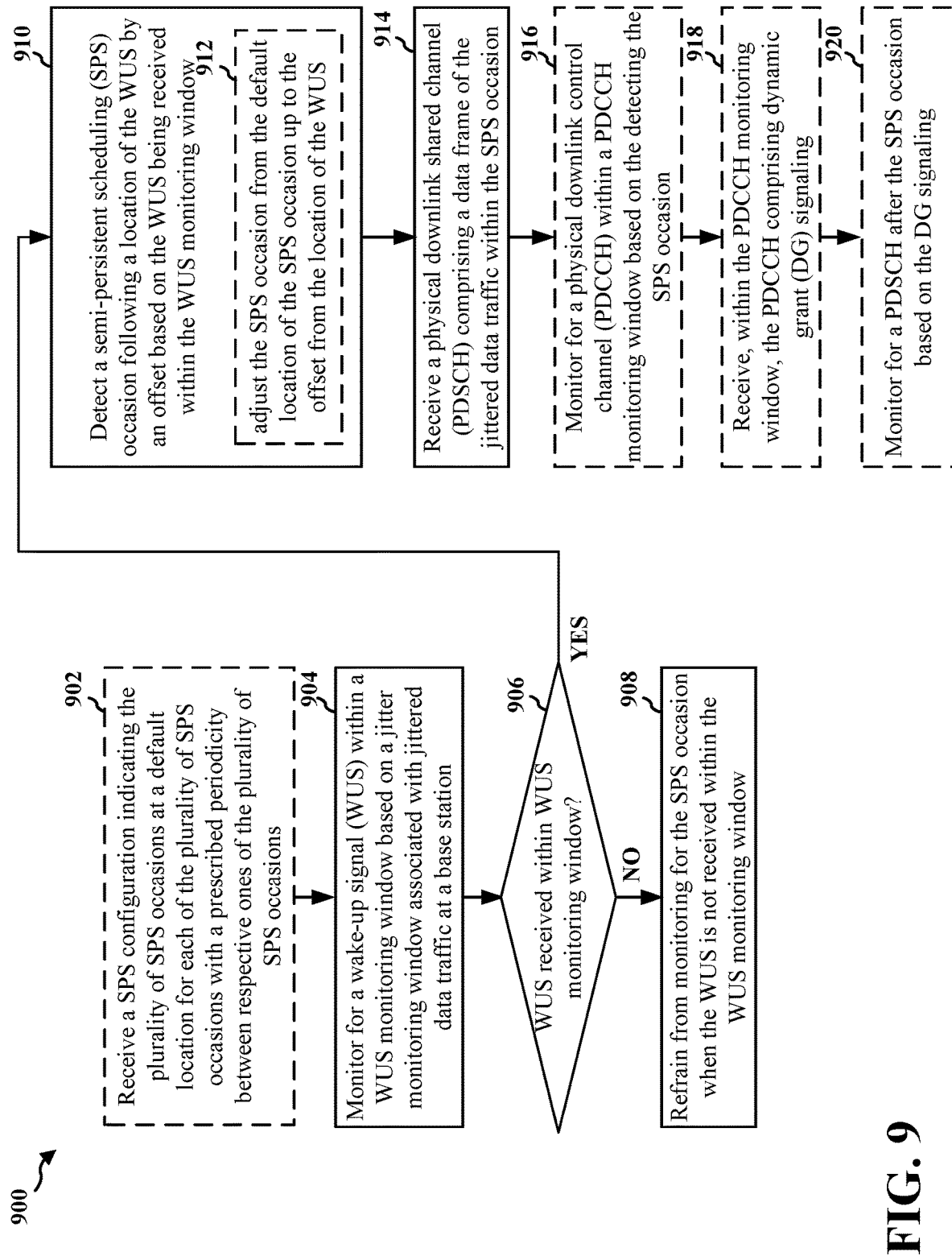
FIG. 9 is a flowchart of a method of wireless communication at a UE in accordance with aspects presented herein.

FIG. 9 is a flowchart 900 of a method of wireless communication. The method may be performed by a UE or a component of a UE (e.g., the UE 104, 350; a processing system, which may include the memory 360 and which may be the entire UE 350 or a component of the UE 350, such as the TX processor 368, the RX processor 356, and/or the controller/processor 359). Optional aspects are illustrated with a dashed line. The method improves the efficient use of WUS-based SPS resources for jittered XR traffic.

At 902, the UE may receive a SPS configuration indicating the plurality of SPS occasions at a default location for each of the plurality of SPS occasions with a prescribed periodicity between respective ones of the plurality of SPS occasions. In one or more implementations, the SPS configuration includes a WUS configuration. In some aspects, the WUS configuration may be applied across multiple carriers. For scenarios involving multiple streams (e.g., audio stream, video stream, media stream, etc.), the base station may select to use multiple carriers. For example, the WUS configuration and/or the SPS configuration may configure the SPS periodicity, the jitter monitoring window and/or SPS parameters (e.g., where the MCS may be different for each UE and each carrier). In other aspects, the WUS configuration may be applied across different (or multiple) UEs. This can be used in scenarios where multiple UEs in a network are configured to operate with a similar type of traffic. The WUS can be sent across the multiple UEs; however, a particular UE may monitor for a specific WUS based on the offset and periodicity of when its own traffic started. This can help reduce the frequency of transmitting the WUS per UE. In some aspects, the WUS can be scrambled with a CRNTI of one or more of the multiple UEs so that the UE knows whether to decode a WUS message intended for it or not.

At 904, the UE may monitor for a WUS within a WUS monitoring window based on a jitter monitoring window associated with jittered data traffic at the base station 102/180. The UE may then receive the WUS. In some aspects, the WUS can include a density based on a tradeoff between latency and power consumption for detecting the WUS. In some aspects, the density of the WUS may be based on one or more of a periodicity of the WUS or a first WUS including information of a location for a second WUS. In some aspects, the information in the first WUS includes a payload indicating to the UE to refrain from monitoring for a PDSCH of the SPS occasion, to monitor for the PDSCH of the SPS occasion, or to modify the PDSCH of the SPS occasion. In some aspects, the payload indicates a modulation and coding scheme (MCS) to be used in the PDSCH of the SPS occasion.

At 906, the UE may determine whether the WUS is received within the WUS monitoring window. If the WUS is received within the WUS monitoring window, then the method may proceed to block 910. Otherwise, the method proceeds to block 908.

At 908, the UE may refrain from monitoring for the SPS occasion when the WUS is not received within the WUS monitoring window.

At 910, the UE may detect a SPS occasion following a location of the WUS by an offset based on the WUS being received within the WUS monitoring window. In detecting the SPS occasion, the UE may monitor for one or more of a plurality of SPS occasions at a default location for each of the plurality of SPS occasions with a prescribed periodicity between respective ones of the plurality of SPS occasions. In some aspects, the default location of each of the plurality of SPS occasions corresponds to a centered location in the jitter monitoring window. In detecting the SPS occasion, the UE may adjust the SPS occasion from the default location of the SPS occasion up to the offset from the location of the WUS, e.g., as described in connection with 912.

In one or more implementations, the UE monitors for the downlink transmission during one or more opportunity of an SPS occasion. Monitoring for the downlink transmission may include performing blind decoding for a PDSCH at each opportunity of the SPS occasion until the downlink transmission is successfully received. In some examples, the UE may monitor for the downlink transmission during each of the opportunities of the SPS occasion. In some examples, the UE may monitor for the downlink transmission during the opportunities of the SPS occasion until the UE successfully receives a downlink transmission. If the UE successfully receives the downlink transmission prior to the last opportunity, the UE may stop monitoring for the opportunities of the SPS occasion.

At 914, the UE may receive, within the SPS occasion, a PDSCH that includes a data frame of the jittered data traffic.

At 916, the UE may monitor for a PDCCH within a PDCCH monitoring window based on the detecting the SPS occasion. In some aspects, the PDCCH monitoring window has a length that is based on the jitter monitoring window.

At 918, the UE may receive, within the PDCCH monitoring window, the PDCCH comprising dynamic grant signaling.

At 920, the UE may monitor for a physical downlink shared channel (PDSCH) after the SPS occasion based on the DG signaling.

Each block in the aforementioned flowchart of FIG. 9 and/or the aspects that are performed by the UE in any of FIGS. 5-8 may be performed by a component of a UE apparatus that may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the UE includes means for performing the method described in connection with FIG. 9 and/or the aspects performed by the UE in any of FIGS. 5-8. The aforementioned means may be one or more of the aforementioned components of an apparatus and/or a processing system of such an apparatus configured to perform the functions recited by the aforementioned means. The processing system may include a transmission processor, a reception processor, and a controller/processor. As such, in one configuration, the aforementioned means may be memory 360, such as the TX processor 368, the RX processor 356, and/or the controller/processor 359 configured to perform the functions recited by the aforementioned means.

Figure 10:
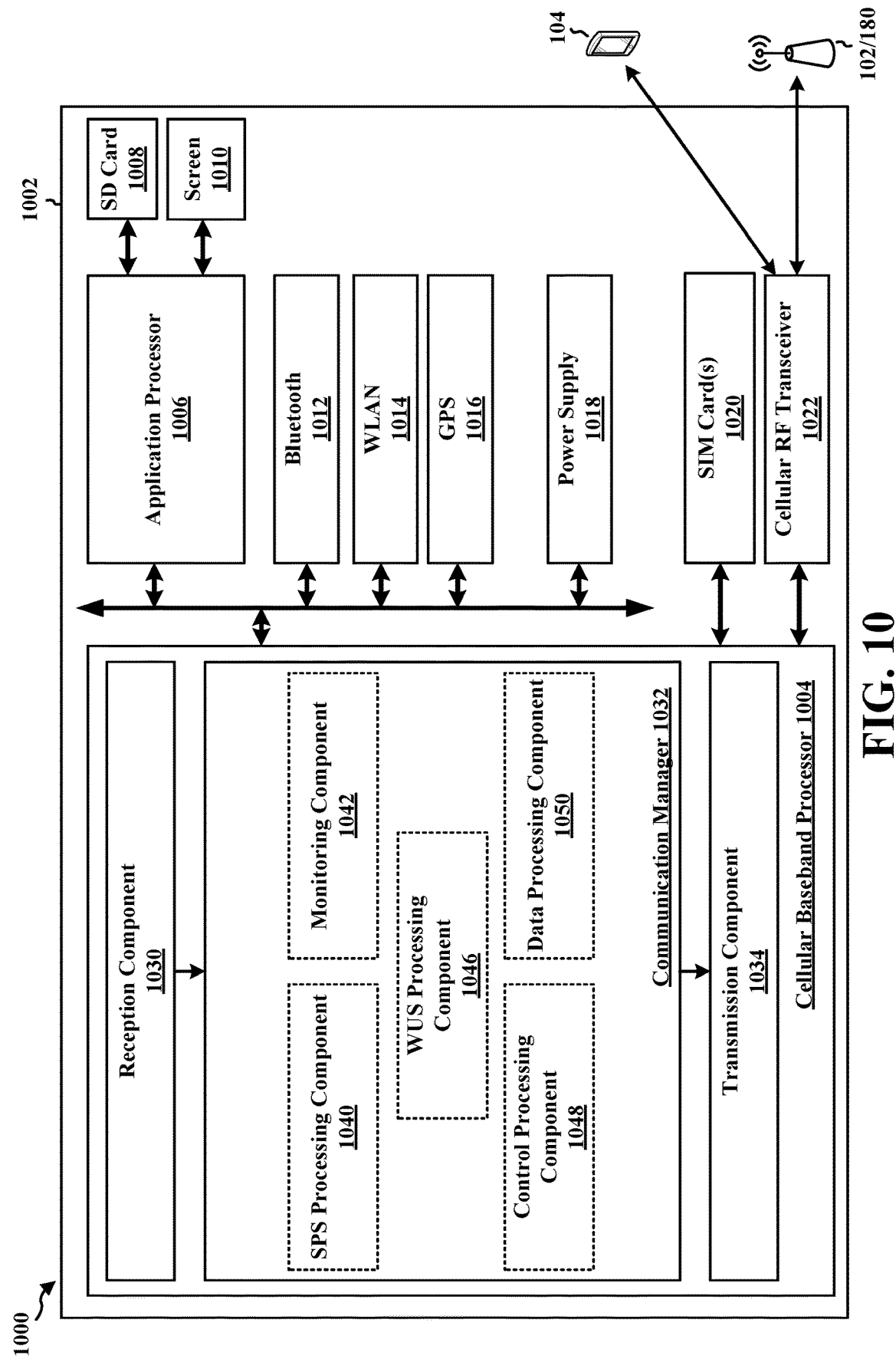
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a SPS processing component 1040 that is configured to receive a SPS configuration indicating the plurality of SPS occasions at a default location for each of the plurality of SPS occasions with a prescribed periodicity between respective ones of the plurality of SPS occasions, e.g., as described in connection with 902. The communication manager 1032 further includes a monitoring component 1042 that is configured to monitor for a WUS within a WUS monitoring window based on a jitter monitoring window associated with jittered data traffic at a base station, e.g., as described in connection with 904. The communication manager 1032 further includes a WUS processing component 1046 that is configured to determine whether the WUS is received within WUS monitoring window, e.g., as described in connection with 906. The monitoring component 1042 may be further configured to refrain from monitoring for the SPS occasion when the WUS is not received within the WUS monitoring window, e.g., as described in connection with 908. The SPS processing component 1040 may be further configured to detect a SPS occasion following a location of the WUS by an offset based on the WUS being received within the WUS monitoring window, e.g., as described in connection with 910. The SPS processing component 1040 may be further configured to adjust the SPS occasion from the default location of the SPS occasion up to the offset from the location of the WUS, e.g., as described in connection with 912. The communication manager 1032 further includes a data processing component 1050 that is configured to receive a PDSCH comprising a data frame of the jittered data traffic within the SPS occasion, e.g., as described in connection with 914. The monitoring component 1042 may be further configured to monitor for a PDCCH within a PDCCH monitoring window based on the detecting the SPS occasion, e.g., as described in connection with 916. The communication manager 1032 further includes a control processing component 1048 that is configured to receive, within the PDCCH monitoring window, the PDCCH comprising dynamic grant (DG) signaling, e.g., as described in connection with 918. The monitoring component 1042 may be further configured to monitor for a PDSCH after the SPS occasion based on the DG signaling, e.g., as described in connection with 920.

The apparatus may include additional components that perform each of the blocks of the algorithm in the aforementioned flowchart of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for monitoring for a WUS within a WUS monitoring window based on a jitter monitoring window associated with jittered data traffic at a base station, means for determining whether the WUS is received within the WUS monitoring window, and means for detecting a SPS occasion following a location of the WUS by an offset based on the WUS being received within the WUS monitoring window.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
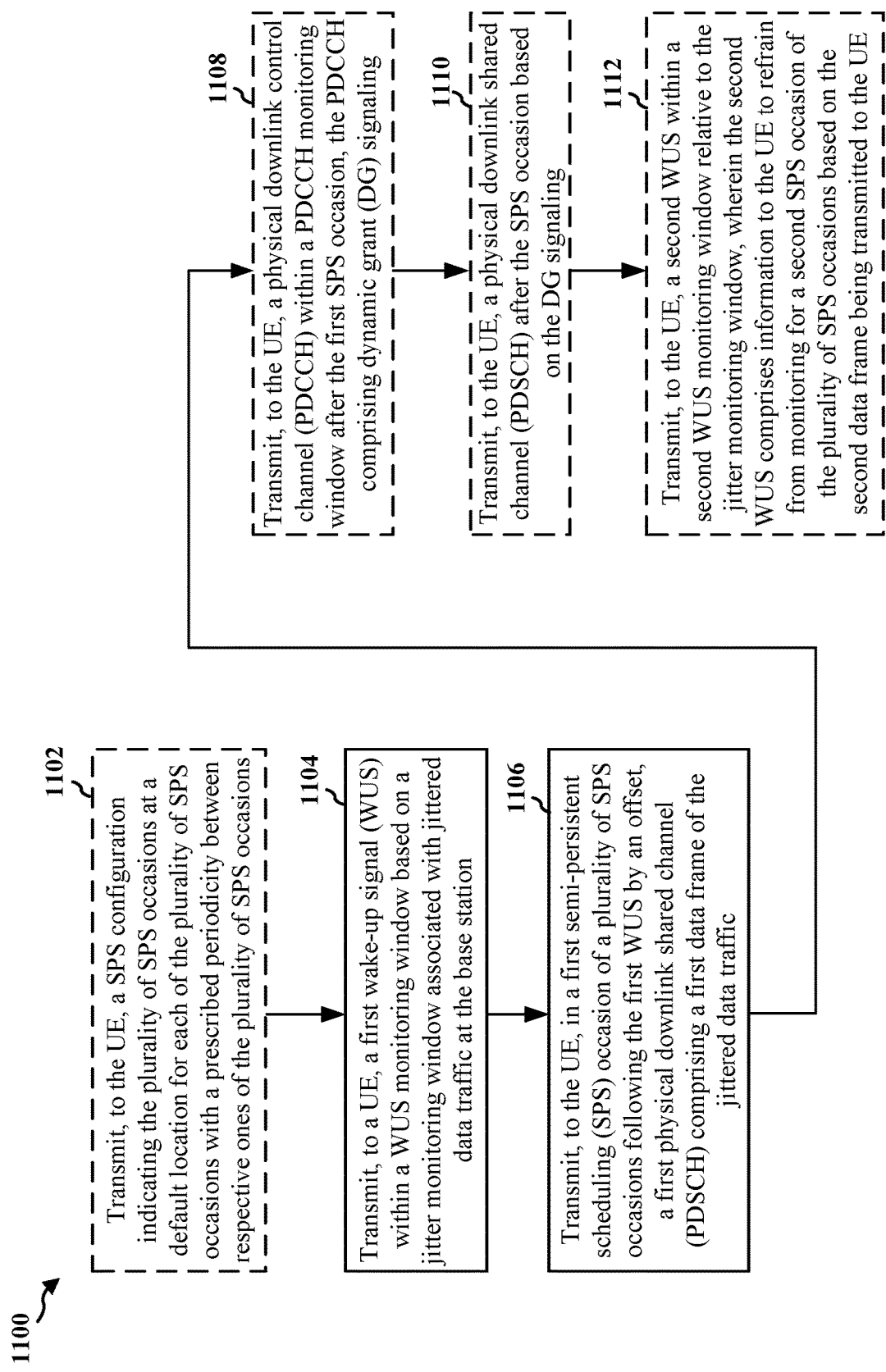
FIG. 11 is a flowchart of a method of wireless communication at a base station in accordance with aspects presented herein.

FIG. 11 is a flowchart 1100 of a method of wireless communication. The method may be performed by a base station or a component of a base station (e.g., the base station 102, 180, 310; a processing system, which may include the memory 376 and which may be the entire base station 310 or a component of the base station 310, such as the TX processor 316, the RX processor 370, and/or the controller/processor 375). Optional aspects are illustrated with a dashed line. The method improves the efficient use of resources for jittered periodic traffic.

At 1102, the base station transmits, to the UE, a SPS configuration indicating a plurality of SPS occasions at a default location for each of the plurality of SPS occasions with a prescribed periodicity between respective ones of the plurality of SPS occasions. In some aspects, the base station may configure the UE for the plurality of SPS occasions with each SPS occasion including multiple opportunities for downlink transmission by the base station. The plurality of SPS occasions may be for a single SPS configuration. In some examples, each of the multiple opportunities may correspond to a respective slot that are offset from one another within the SPS occasion. For example, each SPS occasion may include multiple opportunities.

At 1104, the base station transmits, to a UE, a first WUS within a WUS monitoring window based on a jitter monitoring window associated with jittered data traffic at the base station.

At 1106, the base station transmits, to the UE, in a first SPS occasion of a plurality of SPS occasions following the first WUS by an offset, a first PDSCH that includes a first data frame of the jittered data traffic. In some aspects, the base station may transmit additional PDSCHs containing additional data packets of the jittered data traffic after the first SPS occasion.

At 1108, the base station transmits, to the UE, a PDCCH within a PDCCH monitoring window after the first SPS occasion. In some aspects, the PDCCH includes dynamic grant signaling.

At 1110, the base station transmits, to the UE, a PDSCH after the SPS occasion based on the DG signaling. In some aspects, the PDSCH includes one or more data packets of the jittered data traffic that arrived at the base station after the first SPS occasion.

At 1112, the base station transmits, to the UE, a second WUS within a second WUS monitoring window relative to the jitter monitoring window. In some aspects, the second WUS includes information to the UE to refrain from monitoring for a second SPS occasion of the plurality of SPS occasions based on the second data frame being already transmitted to the UE.

Each block in the aforementioned flowchart of FIG. 11 and/or the aspects that are performed by the base station in any of FIGS. 5-8 may be performed by a component of a base station apparatus that may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the base station apparatus includes means for performing the method described in connection with FIG. 11 and/or the aspects performed by the base station in any of FIGS. 5-8. The aforementioned means may be one or more of the aforementioned components of an apparatus and/or a processing system of such an apparatus configured to perform the functions recited by the aforementioned means. The processing system may include a transmission processor, a reception processor, and a controller/processor. As such, in one configuration, the aforementioned means may be memory 360, such as the TX processor 368, the RX processor 356, and/or the controller/processor 359 configured to perform the functions recited by the aforementioned means.

Figure 12:
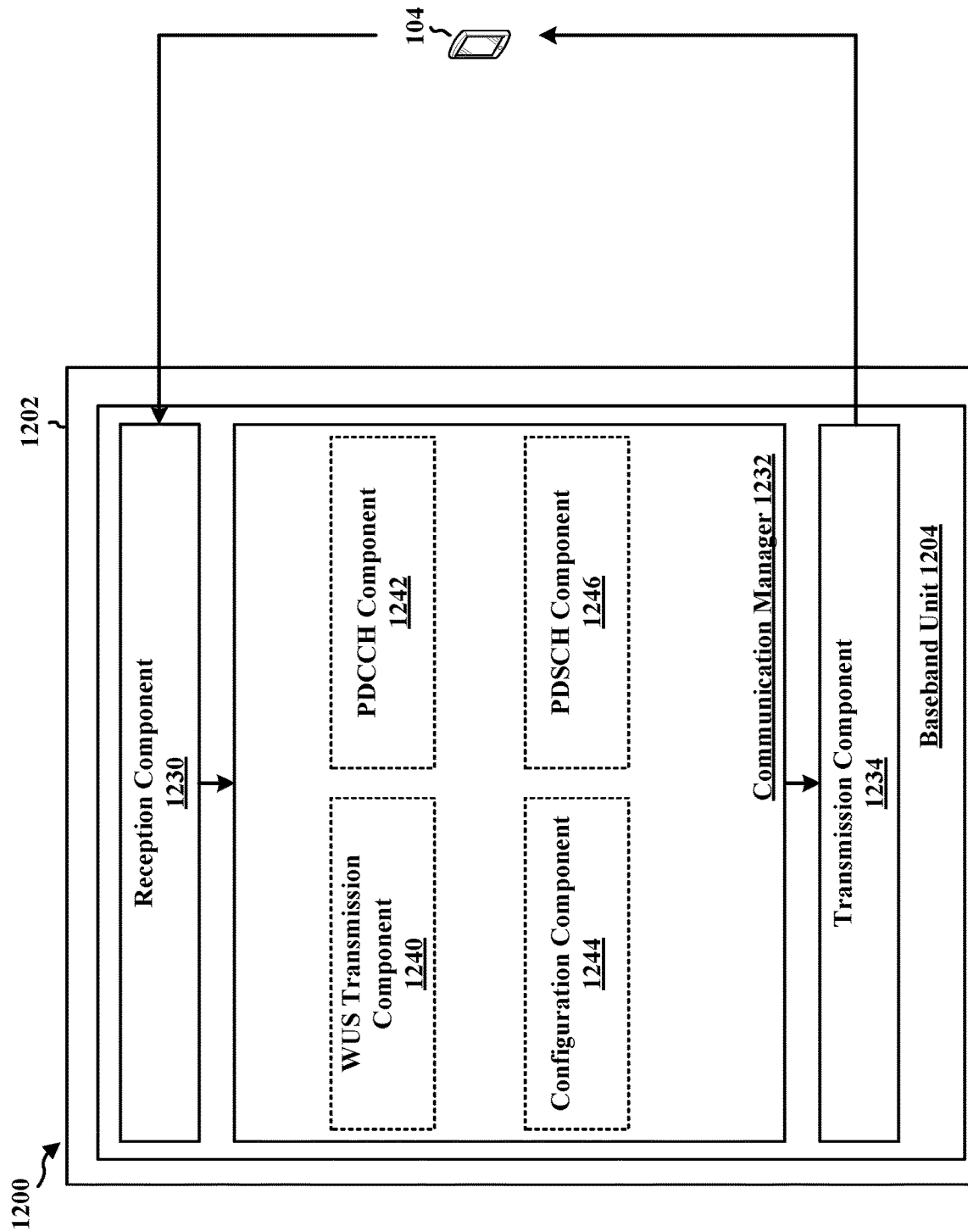
FIG. 12 is a diagram illustrating another example of a hardware implementation for another example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The communication manager 1232 includes a WUS transmission component 1240 that is configured to transmit, to a UE, a first WUS within a WUS monitoring window based on a jitter monitoring window associated with jittered data traffic at the base station, e.g., as described in connection with 1104. The communication manager 1232 further includes a PDCCH component 1242 that is configured to transmit, to the UE, a PDCCH within a PDCCH monitoring window after the first SPS occasion, the PDCCH comprising dynamic grant (DG) signaling, e.g., as described in connection with 1108. The communication manager 1232 further includes a configuration component 1244 that is configured to transmit, to the UE, a SPS configuration indicating the plurality of SPS occasions at a default location for each of the plurality of SPS occasions with a prescribed periodicity between respective ones of the plurality of SPS occasions, e.g., as described in connection with 1102. The communication manager 1232 further includes a PDSCH component 1246 that is configured to transmit, to the UE, in a first SPS occasion of a plurality of SPS occasions following the first WUS by an offset, a first PDSCH that includes a first data frame of the jittered data traffic, e.g., as described in connection with 1106. The PDSCH component 1246 may be further configured to transmit, to the UE, a PDSCH after the SPS occasion based on the DG signaling, e.g., as described in connection with 1110. The WUS transmission component 1240 may be further configured to transmit, to the UE, a second WUS within a second WUS monitoring window relative to the jitter monitoring window, e.g., as described in connection with 1112. In some aspects, the second WUS includes information to the UE to refrain from monitoring for a second SPS occasion of the plurality of SPS occasions based on the second data frame being transmitted to the UE.

The apparatus may include additional components that perform each of the blocks of the algorithm in the aforementioned flowchart of FIG. 11. As such, each block in the aforementioned flowcharts of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for transmitting, to a user equipment (UE), a first wake-up signal (WUS) within a WUS monitoring window based on a jitter monitoring window associated with jittered data traffic at the base station, and means for transmitting, to the UE, in a first semi-persistent scheduling (SPS) occasion of a plurality of SPS occasions following the first WUS by an offset, a first physical downlink shared channel (PDSCH) comprising a first data frame of the jittered data traffic.

The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and aspects thereof may be combined with aspects of other embodiments or teaching described herein, without limitation.

Example 1 includes a method of wireless communication performed by a user equipment (UE) that includes monitoring for a wake-up signal (WUS) within a WUS monitoring window based on a jitter monitoring window associated with jittered data traffic at a base station; determining whether the WUS is received within the WUS monitoring window; and detecting a semi-persistent scheduling (SPS) occasion following a location of the WUS by an offset based on the WUS being received within the WUS monitoring window.

In Example 2, the method of Example 1 further includes that the detecting the SPS occasion comprises monitoring for one or more of a plurality of SPS occasions at a default location for each of the plurality of SPS occasions with a prescribed periodicity between respective ones of the plurality of SPS occasions.

In Example 3, the method of Example 2 further includes that the default location of each of the plurality of SPS occasions corresponds to a centered location in the jitter monitoring window.

In Example 4, the method of Example 2 further includes that the detecting the SPS occasion comprises adjusting the SPS occasion from the default location of the SPS occasion up to the offset from the location of the WUS.

In Example 5, the method of any of Examples 1-4 further includes that the WUS comprises a density based on a tradeoff between latency and power consumption for detecting the WUS, the density of the WUS being based on one or more of a periodicity of the WUS or a first WUS comprising information of a location for a second WUS.

In Example 6, the method of Example 5 further includes that the information in the first WUS comprises a payload indicating to the UE to refrain from monitoring for a physical downlink shared channel (PDSCH) of the SPS occasion, to monitor for the PDSCH of the SPS occasion, or to modify the PDSCH of the SPS occasion.

In Example 7, the method of Example 6 further includes that the payload indicates a modulation and coding scheme (MCS) to be used in the PDSCH of the SPS occasion.

In Example 8, the method of any of Examples 1-7 further includes monitoring for a physical downlink control channel (PDCCH) within a PDCCH monitoring window based on the detecting the SPS occasion.

In Example 9, the method of Example 8 further includes that the PDCCH monitoring window has a length that is based on the jitter monitoring window.

In Example 10, the method of Example 8 further includes receiving, within the PDCCH monitoring window, the PDCCH comprising dynamic grant (DG) signaling.

In Example 11, the method of Example 10 further includes monitoring for a physical downlink shared channel (PDSCH) after the SPS occasion based on the DG signaling.

In Example 12, the method of any of Examples 1-11 further includes refraining from monitoring for the SPS occasion when the WUS is not received within the WUS monitoring window.

In Example 13, the method of any of Examples 1-12 further includes receiving a first WUS within a first WUS monitoring window; receiving a first physical downlink shared channel (PDSCH) comprising a first data frame of the jittered data traffic within a first SPS occasion of a plurality of SPS occasions following the first WUS by the offset; receiving a second WUS within a second WUS monitoring window; and receiving a second PDSCH comprising a second data frame of the jittered data traffic within a second SPS occasion of the plurality of SPS occasions following the second WUS by the offset.

In Example 14, the method of any of Examples 1-13 further includes receiving a first WUS within a first WUS monitoring window relative to the jitter monitoring window; receiving a first physical downlink shared channel (PDSCH) comprising a first data frame of the jittered data traffic within a first SPS occasion of a plurality of SPS occasions following the first WUS by the offset; receiving a physical downlink control channel (PDCCH) comprising a dynamic grant following the first SPS occasion; and receiving a second PDSCH comprising a second data frame of the jittered data traffic based on the dynamic grant.

In Example 15, the method of Example 14 further includes receiving a second WUS within a second WUS monitoring window relative to the jitter monitoring window, wherein the second WUS comprises information to the UE to refrain from monitoring for a second SPS occasion of the plurality of SPS occasions based on the second data frame being transmitted to the UE; and refraining from monitoring for the second SPS occasion based on the information in the second WUS.

In Example 16, the method of any of Examples 1-15 further includes receiving a first WUS within a first WUS monitoring window relative to the jitter monitoring window, wherein the first WUS comprises a payload with information to the UE to activate one or more preconfigured resources after a first SPS occasion of a plurality of SPS occasions; receiving a first physical downlink shared channel (PDSCH) comprising a first data frame of the jittered data traffic within the first SPS occasion following the first WUS by the offset; receiving a second PDSCH comprising a second data frame of the jittered data traffic after the first SPS occasion using the one or more preconfigured resources; receiving a second WUS within a second WUS monitoring window relative to the jitter monitoring window, wherein the second WUS comprises information to the UE to refrain from monitoring for a second SPS occasion of a plurality of SPS occasions based on the second data frame being transmitted to the UE; and refraining from monitoring for the second SPS occasion based on the information in the second WUS.

In Example 17, the method of any of Examples 1-16 further includes receiving a first WUS within a first WUS monitoring window relative to the jitter monitoring window, wherein the first WUS comprises a payload with information to the UE to activate one or more preconfigured resources after a first SPS occasion of a plurality of SPS occasions; receiving a first physical downlink shared channel (PDSCH) comprising a first data frame of the jittered data traffic within the first SPS occasion following the first WUS by the offset; receiving a second PDSCH comprising a second data frame of the jittered data traffic after the first SPS occasion using the one or more preconfigured resources; monitoring for a second WUS within a second WUS monitoring window relative to the jitter monitoring window; determining whether the second WUS is received within the second WUS monitoring window; adjusting the second WUS monitoring window by a length that extends beyond one or more of a default location of a second SPS occasion or a location of a physical downlink control channel (PDCCH) monitoring window; receiving the second WUS within the adjusted second WUS monitoring window; and receiving a third PDSCH comprising a third data frame of the jittered data traffic within the second SPS occasion following the second WUS by the offset.

Example 18 is a device including one or more processors and one or more memories in electronic communication with the one or more processors storing instructions executable by the one or more processors to cause the device to implement a method as in any of Examples 1-17.

Example 19 is a system or apparatus including means for implementing a method or realizing an apparatus as in any of Examples 1-17.

Example 20 is a non-transitory computer readable medium storing instructions executable by one or more processors to cause the one or more processors to implement a method as in any of Examples 1-17.

Example 21 is a method of wireless communication performed by a base station that includes transmitting, to a user equipment (UE), a first wake-up signal (WUS) within a WUS monitoring window based on a jitter monitoring window associated with jittered data traffic at the base station; and transmitting, to the UE, in a first semi-persistent scheduling (SPS) occasion of a plurality of SPS occasions following the first WUS by an offset, a first physical downlink shared channel (PDSCH) comprising a first data frame of the jittered data traffic.

In Example 22, the method of Example 21 further includes transmitting, to the UE, a SPS configuration indicating the plurality of SPS occasions at a default location for each of the plurality of SPS occasions with a prescribed periodicity between respective ones of the plurality of SPS occasions, wherein the default location of each of the plurality of SPS occasions corresponds to a centered location in the jitter monitoring window.

In Example 23, the method of any of Examples 21 or 22 further includes that the first WUS comprises a payload indicating to the UE to refrain from monitoring for a second PDSCH of one of the plurality of SPS occasions, to monitor for the second PDSCH of the one of the plurality of SPS occasions, or to modify the second PDSCH of the one of the plurality of SPS occasions.

In Example 24, the method of Example 23 further includes that the payload indicates a modulation and coding scheme (MCS) to be used in the PDSCH of the SPS occasion.

In Example 25, the method of Example 21 further includes transmitting, to the UE, a physical downlink control channel (PDCCH) within a PDCCH monitoring window after the first SPS occasion, the PDCCH comprising dynamic grant (DG) signaling.

In Example 26, the method of Example 25 further includes that the PDCCH monitoring window has a length that is based on the jitter monitoring window.

In Example 27, the method of Example 21 further includes transmitting, to the UE, a first WUS within a first WUS monitoring window; transmitting, to the UE, a first physical downlink shared channel (PDSCH) comprising a first data frame of the jittered data traffic within a first SPS occasion of the plurality of SPS occasions following the first WUS by the offset; transmitting, to the UE, a second WUS within a second WUS monitoring window; and transmitting, to the UE, a second PDSCH comprising a second data frame of the jittered data traffic within a second SPS occasion of the plurality of SPS occasions following the second WUS by the offset.

In Example 28, the method of Example 21 further includes transmitting, to the UE, a first WUS within a first WUS monitoring window relative to the jitter monitoring window; transmitting, to the UE, a first physical downlink shared channel (PDSCH) comprising a first data frame of the jittered data traffic within a first SPS occasion of the plurality of SPS occasions following the first WUS by the offset; transmitting, to the UE, a physical downlink control channel (PDCCH) comprising a dynamic grant following the first SPS occasion; and transmitting, to the UE, a second PDSCH comprising a second data frame of the jittered data traffic based on the dynamic grant.

In Example 29, the method of Example 28 further includes transmitting, to the UE, a second WUS within a second WUS monitoring window relative to the jitter monitoring window, wherein the second WUS comprises information to the UE to refrain from monitoring for a second SPS occasion of the plurality of SPS occasions based on the second data frame being transmitted to the UE.

In Example 30, the method of Example 21 further includes transmitting, to the UE, a first WUS within a first WUS monitoring window relative to the jitter monitoring window, wherein the first WUS comprises a payload with information to the UE to activate one or more preconfigured resources after a first SPS occasion of the plurality of SPS occasions; transmitting, to the UE, a first physical downlink shared channel (PDSCH) comprising a first data frame of the jittered data traffic within the first SPS occasion following the first WUS by the offset; transmitting, to the UE, a second PDSCH comprising a second data frame of the jittered data traffic after the first SPS occasion using the one or more preconfigured resources; and transmitting, to the UE, a second WUS within a second WUS monitoring window relative to the jitter monitoring window, wherein the second WUS comprises information to the UE to refrain from monitoring for a second SPS occasion of the plurality of SPS occasions based on the second data frame being transmitted to the UE.

In Example 31, the method of Example 19 further includes transmitting, to the UE, a first WUS within a first WUS monitoring window relative to the jitter monitoring window, wherein the first WUS comprises a payload with information to the UE to activate one or more preconfigured resources after a first SPS occasion of the plurality of SPS occasions; transmitting, to the UE, a first physical downlink shared channel (PDSCH) comprising a first data frame of the jittered data traffic within the first SPS occasion following the first WUS by the offset; transmitting, to the UE, a second PDSCH comprising a second data frame of the jittered data traffic on the one or more preconfigured resources after the first SPS occasion; transmitting, to the UE, a second WUS within a second WUS monitoring window having a length that extends beyond one or more of a default location of a second SPS occasion or a location of a physical downlink control channel (PDCCH) monitoring window; and transmitting, to the UE, a third PDSCH comprising a third data frame of the jittered data traffic within the second SPS occasion following the second WUS by the offset.

Example 32 is a device including one or more processors and one or more memories in electronic communication with the one or more processors storing instructions executable by the one or more processors to cause the device to implement a method as in any of Examples 21-31.

Example 33 is a system or apparatus including means for implementing a method or realizing an apparatus as in any of Examples 21-31.

Example 34 is a non-transitory computer readable medium storing instructions executable by one or more processors to cause the one or more processors to implement a method as in any of Examples 21-31.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), comprising:
   monitoring for a wake-up signal (WUS) within a WUS monitoring window based on a jitter monitoring window associated with jittered data traffic at a base station;
   determining whether the WUS is received within the WUS monitoring window;
   detecting a semi-persistent scheduling (SPS) occasion following a location of the WUS by an offset based on the WUS being received within the WUS monitoring window; and
   monitoring for another WUS within another WUS monitoring window based on the jitter monitoring window, the another WUS including a payload indicating to the UE to perform blind decoding for a physical downlink shared channel (PDSCH) at another SPS occasion.

2. The method of claim 1, wherein the detecting the SPS occasion comprises monitoring for one or more of a plurality of SPS occasions at a default location for each of the plurality of SPS occasions with a prescribed periodicity between respective ones of the plurality of SPS occasions.

3. The method of claim 2, wherein the default location of each of the plurality of SPS occasions corresponds to a centered location in the jitter monitoring window.

4. The method of claim 2, wherein the detecting the SPS occasion comprises adjusting the SPS occasion from the default location of the SPS occasion up to the offset from the location of the WUS.

5. The method of claim 1, wherein the WUS comprises a density based on a tradeoff between latency and power consumption for detecting the WUS, the density of the WUS being based on one or more of a periodicity of the WUS or a first WUS comprising information of a location for a second WUS.

6. The method of claim 1, further comprising receiving a downlink packet of the jittered data traffic within the SPS occasion, the downlink packet having a jittered arrival at the base station.

7. The method of claim 1, wherein the payload indicates a modulation and coding scheme (MCS) to be used in the PDSCH.

8. The method of claim 1, further comprising monitoring for a physical downlink control channel (PDCCH) within a PDCCH monitoring window based on the detecting the SPS occasion.

9. The method of claim 8, wherein the PDCCH monitoring window has a length that is based on the jitter monitoring window.

10. The method of claim 8, further comprising receiving, within the PDCCH monitoring window, the PDCCH comprising dynamic grant (DG) signaling.

11. The method of claim 10, further comprising monitoring for a physical downlink shared channel (PDSCH) after the SPS occasion based on the DG signaling.

12. The method of claim 1, further comprising refraining from monitoring for the another SPS occasion when the another WUS is not received within the another WUS monitoring window.

13. The method of claim 1, further comprising:
receiving a first WUS within a first WUS monitoring window;
receiving a first physical downlink shared channel (PDSCH) comprising a first data frame of the jittered data traffic within a first SPS occasion of a plurality of SPS occasions following the first WUS by the offset;
receiving a second WUS within a second WUS monitoring window; and
receiving a second PDSCH comprising a second data frame of the jittered data traffic within a second SPS occasion of the plurality of SPS occasions following the second WUS by the offset.

14. The method of claim 1, further comprising:
receiving a first WUS within a first WUS monitoring window relative to the jitter monitoring window;
receiving a first physical downlink shared channel (PDSCH) comprising a first data frame of the jittered data traffic within a first SPS occasion of a plurality of SPS occasions following the first WUS by the offset;
receiving a physical downlink control channel (PDCCH) comprising a dynamic grant following the first SPS occasion; and
receiving a second PDSCH comprising a second data frame of the jittered data traffic based on the dynamic grant.

15. The method of claim 14, further comprising:
receiving a second WUS within a second WUS monitoring window relative to the jitter monitoring window, wherein the second WUS comprises information to the UE to refrain from monitoring for a second SPS occasion of the plurality of SPS occasions based on the second data frame being transmitted to the UE; and
refraining from monitoring for the second SPS occasion based on the information in the second WUS.

16. The method of claim 1, further comprising:
receiving a first WUS within a first WUS monitoring window relative to the jitter monitoring window, wherein the first WUS comprises a payload with information to the UE to activate one or more preconfigured resources after a first SPS occasion of a plurality of SPS occasions;
receiving a first physical downlink shared channel (PDSCH) comprising a first data frame of the jittered data traffic within the first SPS occasion following the first WUS by the offset;
receiving a second PDSCH comprising a second data frame of the jittered data traffic after the first SPS occasion using the one or more preconfigured resources;
receiving a second WUS within a second WUS monitoring window relative to the jitter monitoring window, wherein the second WUS comprises information to the UE to refrain from monitoring for a second SPS occasion of a plurality of SPS occasions based on the second data frame being transmitted to the UE; and
refraining from monitoring for the second SPS occasion based on the information in the second WUS.

17. The method of claim 1, further comprising:
receiving a first WUS within a first WUS monitoring window relative to the jitter monitoring window, wherein the first WUS comprises a payload with information to the UE to activate one or more preconfigured resources after a first SPS occasion of a plurality of SPS occasions;
receiving a first physical downlink shared channel (PDSCH) comprising a first data frame of the jittered data traffic within the first SPS occasion following the first WUS by the offset;
receiving a second PDSCH comprising a second data frame of the jittered data traffic after the first SPS occasion using the one or more preconfigured resources;
monitoring for a second WUS within a second WUS monitoring window relative to the jitter monitoring window;
determining whether the second WUS is received within the second WUS monitoring window;
adjusting the second WUS monitoring window by a length that extends beyond one or more of a default location of a second SPS occasion or a location of a physical downlink control channel (PDCCH) monitoring window;
receiving the second WUS within the adjusted second WUS monitoring window; and
receiving a third PDSCH comprising a third data frame of the jittered data traffic within the second SPS occasion following the second WUS by the offset.

18. An apparatus for wireless communication, comprising:
at least one processor;
a transceiver; and
a memory, coupled to the at least one processor and the transceiver, having stored instructions thereon, which when executed by the at least one processor, causes the apparatus to:
monitor for, via the transceiver, a wake-up signal (WUS) within a WUS monitoring window based on a jitter monitoring window associated with jittered data traffic at a base station;
determine whether the WUS is received within the WUS monitoring window;
detect a semi-persistent scheduling (SPS) occasion following a location of the WUS by an offset based on the WUS being received within the WUS monitoring window; and
monitor for, via the transceiver, another WUS within another WUS monitoring window based on the jitter monitoring window, the another WUS including a payload indicating to the apparatus to perform blind decoding for a physical downlink shared channel (PDSCH) at another SPS occasion.

19. A method of wireless communication performed by a base station, comprising:
  transmitting, to a user equipment (UE), a wake-up signal (WUS) within a WUS monitoring window based on a jitter monitoring window associated with jittered data traffic at the base station;
  transmitting, to the UE, in a semi-persistent scheduling (SPS) occasion of a plurality of SPS occasions and following the WUS by an offset, a physical downlink shared channel (PDSCH) comprising a downlink packet of the jittered data traffic; and
  transmitting, to the UE, another WUS within another WUS monitoring window based on the jitter monitoring window, the another WUS including a payload indicating to the UE to perform blind decoding for another PDSCH at one of the plurality of SPS occasions.

20. The method of claim 19, further comprising transmitting, to the UE, a SPS configuration indicating the plurality of SPS occasions at a default location for each of the plurality of SPS occasions with a prescribed periodicity between respective ones of the plurality of SPS occasions, wherein the default location of each of the plurality of SPS occasions corresponds to a centered location in the jitter monitoring window.

21. The method of claim 19, further comprising receiving the downlink packet having a jittered arrival at the base station.

22. The method of claim 19, wherein the payload indicates a modulation and coding scheme (MCS) to be used in the another PDSCH.

23. The method of claim 19, further comprising transmitting, to the UE, a physical downlink control channel (PDCCH) within a PDCCH monitoring window after the SPS occasion, the PDCCH comprising dynamic grant (DG) signaling.

24. The method of claim 23, wherein the PDCCH monitoring window has a length that is based on the jitter monitoring window.

25. The method of claim 19, further comprising:
  transmitting, to the UE, a first WUS within a first WUS monitoring window;
  transmitting, to the UE, a first physical downlink shared channel (PDSCH) comprising a first data frame of the jittered data traffic within a first SPS occasion of the plurality of SPS occasions following the first WUS by the offset;
  transmitting, to the UE, a second WUS within a second WUS monitoring window; and
  transmitting, to the UE, a second PDSCH comprising a second data frame of the jittered data traffic within a second SPS occasion of the plurality of SPS occasions following the second WUS by the offset.

26. The method of claim 19, further comprising:
  transmitting, to the UE, a first WUS within a first WUS monitoring window relative to the jitter monitoring window;
  transmitting, to the UE, a first physical downlink shared channel (PDSCH) comprising a first data frame of the jittered data traffic within a first SPS occasion of the plurality of SPS occasions following the first WUS by the offset;
  transmitting, to the UE, a physical downlink control channel (PDCCH) comprising a dynamic grant following the first SPS occasion; and
  transmitting, to the UE, a second PDSCH comprising a second data frame of the jittered data traffic based on the dynamic grant.

27. The method of claim 26, further comprising:
  transmitting, to the UE, a second WUS within a second WUS monitoring window relative to the jitter monitoring window, wherein the second WUS comprises information to the UE to refrain from monitoring for a second SPS occasion of the plurality of SPS occasions based on the second data frame being transmitted to the UE.

28. The method of claim 19, further comprising:
  transmitting, to the UE, a first WUS within a first WUS monitoring window relative to the jitter monitoring window, wherein the first WUS comprises a payload with information to the UE to activate one or more preconfigured resources after a first SPS occasion of the plurality of SPS occasions;
  transmitting, to the UE, a first physical downlink shared channel (PDSCH) comprising a first data frame of the jittered data traffic within the first SPS occasion following the first WUS by the offset;
  transmitting, to the UE, a second PDSCH comprising a second data frame of the jittered data traffic after the first SPS occasion using the one or more preconfigured resources; and
  transmitting, to the UE, a second WUS within a second WUS monitoring window relative to the jitter monitoring window, wherein the second WUS comprises information to the UE to refrain from monitoring for a second SPS occasion of the plurality of SPS occasions based on the second data frame being transmitted to the UE.

29. The method of claim 19, further comprising:
  transmitting, to the UE, a first WUS within a first WUS monitoring window relative to the jitter monitoring window, wherein the first WUS comprises a payload with information to the UE to activate one or more preconfigured resources after a first SPS occasion of the plurality of SPS occasions;
  transmitting, to the UE, a first physical downlink shared channel (PDSCH) comprising a first data frame of the jittered data traffic within the first SPS occasion following the first WUS by the offset;
  transmitting, to the UE, a second PDSCH comprising a second data frame of the jittered data traffic on the one or more preconfigured resources after the first SPS occasion;
  transmitting, to the UE, a second WUS within a second WUS monitoring window having a length that extends beyond one or more of a default location of a second SPS occasion or a location of a physical downlink control channel (PDCCH) monitoring window; and
  transmitting, to the UE, a third PDSCH comprising a third data frame of the jittered data traffic within the second SPS occasion following the second WUS by the offset.

30. An apparatus for wireless communication, comprising:
  at least one processor;
  a transceiver; and
  a memory, coupled to the at least one processor and the transceiver, having stored instructions thereon, which when executed by the at least one processor, causes the apparatus to:
    transmit, via the transceiver, to a user equipment (UE), a first wake-up signal (WUS) within a WUS monitoring window based on a jitter monitoring window associated with jittered data traffic at the apparatus;

transmit, via the transceiver, to the UE, in a semi-persistent scheduling (SPS) occasion of a plurality of SPS occasions and following the WUS by an offset, a physical downlink shared channel (PDSCH) comprising a downlink packet of the jittered data traffic; and transmit, via the transceiver, to the UE, another WUS within another WUS monitoring window based on the jitter monitoring window, the another WUS including a payload indicating to the UE to perform blind decoding for another PDSCH at one of the plurality of SPS occasions.

* * * * *